US008860805B2

(12) United States Patent
Park et al.

(10) Patent No.: US 8,860,805 B2
(45) Date of Patent: Oct. 14, 2014

(54) ELECTRONIC DEVICE AND METHOD OF CONTROLLING THE SAME

(75) Inventors: Soungsoo Park, Seoul (KR); Soungmin Im, Seoul (KR)

(73) Assignee: LG Electronics Inc., Seoul (KR)

( * ) Notice: Subject to any disclaimer, the term of this patent is extended or adjusted under 35 U.S.C. 154(b) by 738 days.

(21) Appl. No.: 13/084,943

(22) Filed: Apr. 12, 2011

(65) Prior Publication Data
US 2012/0262574 A1 Oct. 18, 2012

(51) Int. Cl.
H04N 21/4223 (2011.01)
G06F 3/00 (2006.01)
G06T 7/00 (2006.01)

(52) U.S. Cl.
CPC .............. *G06F 3/00* (2013.01); *H04N 21/4223* (2013.01); *G06T 7/00* (2013.01)
USPC ........................................................ 348/143

(58) Field of Classification Search
CPC ....... G06F 3/017; G06F 3/011; G06F 3/0304; G06F 2203/04806; G06K 9/00335; G06K 9/00375; G06K 9/00355; G06K 9/00389; G06K 9/00342; G06K 9/00597; A63F 13/06; A63F 13/10; A63F 2300/69; A63F 2300/8082; G06T 19/006

USPC .......................................................... 348/143
See application file for complete search history.

(56) References Cited

U.S. PATENT DOCUMENTS

2005/0210417 A1* 9/2005 Marvit et al. ................. 715/863
2010/0027845 A1 2/2010 Kim et al.
2010/0199231 A1* 8/2010 Markovic et al. ............. 715/863
2010/0302138 A1* 12/2010 Poot et al. ..................... 345/156

FOREIGN PATENT DOCUMENTS

KR 10-2010-0014092 A 2/2010
KR 10-2011-0002922 A 1/2011
KR 10-2011-0032429 A 3/2011
WO WO 2009/148064 A1 12/2009

* cited by examiner

*Primary Examiner* — Mehrdad Dastouri
*Assistant Examiner* — Mohammed Rahaman
(74) *Attorney, Agent, or Firm* — Birch, Stewart, Kolasch & Birch, LLP

(57) ABSTRACT

An electronic device is provided comprising a camera that obtains an image, and a controller that provides a first control right to a first object included in the obtained image, sets a virtual region including the first object and following a location of the first object, and provides a second control right to a second object when the second object enters into the virtual region.

22 Claims, 34 Drawing Sheets

ELECTRONIC DEVICE AND METHOD OF CONTROLLING THE SAME

BACKGROUND

1. Field

Embodiments of this document are directed to an electronic device, and more specifically to an electronic device that may activate a user interface using a plurality of objects and a method of controlling the electronic device.

2. Related Art

Diversified functions of terminals, such as personal computers, laptop computers, or mobile phones call for multimedia players with various functions including, for example, still or motion image capturing, playback of music or movie files, game play, or broadcast receipt.

Such terminals may be classified into mobile terminals and stationary terminals according to mobility and may be classified into handheld terminals and vehicle mount terminals according to portability.

To enforce and add terminal functions, it may be considered to improve structures and/or software of terminals.

SUMMARY OF THE INVENTION

An exemplary embodiment of this document provides an electronic device and a method of controlling the electronic device, which allow a user to easily and rapidly activate a gesture user interface using a plurality of objects.

For example, the electronic device and the method of controlling the electronic device allow user(s) to easily and rapidly activate a gesture user interface using a plurality of body parts of one or more users.

An exemplary embodiment of this document provides an electronic device and a method of controlling the electronic device, which allows a user to easily and rapidly control a control right provided to a predetermined object through a user interface.

The embodiments of this document are not limited thereto, and other embodiments may also be apparent to those of ordinary skill in the art from the description taken in conjunction with the accompanying drawings.

According to an embodiment of this document, there is provided an electronic device including a camera that obtains an image, and a controller. The controller provides a first control right to a first object included in the obtained image, sets a virtual region including the first object and following a location of the first object, and provides a second control right to a second object when the second object enters into the virtual region.

According to an embodiment of this document, there is provided an electronic device including a camera that obtains an image, and a controller. The controller provides a first control right to a first object included in the obtained image, sets a fixed region including the first object as a virtual region at a predetermined time, and provides a second control right to a second object when the second object enters into the virtual region.

According to an embodiment of this document, there is provided a method of controlling an electronic device including obtaining an image, providing a first control right to a first object included in the obtained image, setting a virtual region including the first object and following a location of the first object, and providing a second control right to a second object when the second object enters into the virtual region.

According to an embodiment of this document, there is provided a method of controlling an electronic device including obtaining an image, providing a first control right to a first object included in the obtained image, setting a fixed region including the first object as a virtual region at a predetermined time, and providing a second control right to a second object when the second object enters into the virtual region.

According to the embodiments of this document, the electronic device and the method of controlling the electronic device may easily and rapidly activate a gesture user interface using a plurality of objects and may control the electronic device through the gesture user interface.

Further, the electronic device and the method of controlling the electronic device allow a user to easily and rapidly control a control right provided to a predetermined object through a gesture user interface.

BRIEF DESCRIPTION OF THE DRAWINGS

The implementations of the embodiments of the present invention will be described in detail as examples with reference to the following drawings in which like numerals may refer to like elements.

DETAILED DESCRIPTION OF PREFERRED EMBODIMENTS

Embodiments of the present invention will now be described more fully with reference to the accompanying drawings, in which exemplary embodiments of this document are shown. This document may, however, be embodied in many different forms and should not be construed as being limited to the embodiments set forth herein; rather, there embodiments are provided so that this disclosure will be thorough and complete, and will fully convey the concept of this document to those skilled in the art.

Hereinafter, an electronic device relating to this document will be described below in more detail with reference to the accompanying drawings. In the following description, suffixes "module" and "unit" are given to components of the mobile terminal in consideration of only facilitation of description and do not have meanings or functions discriminated from each other.

Figure 1:
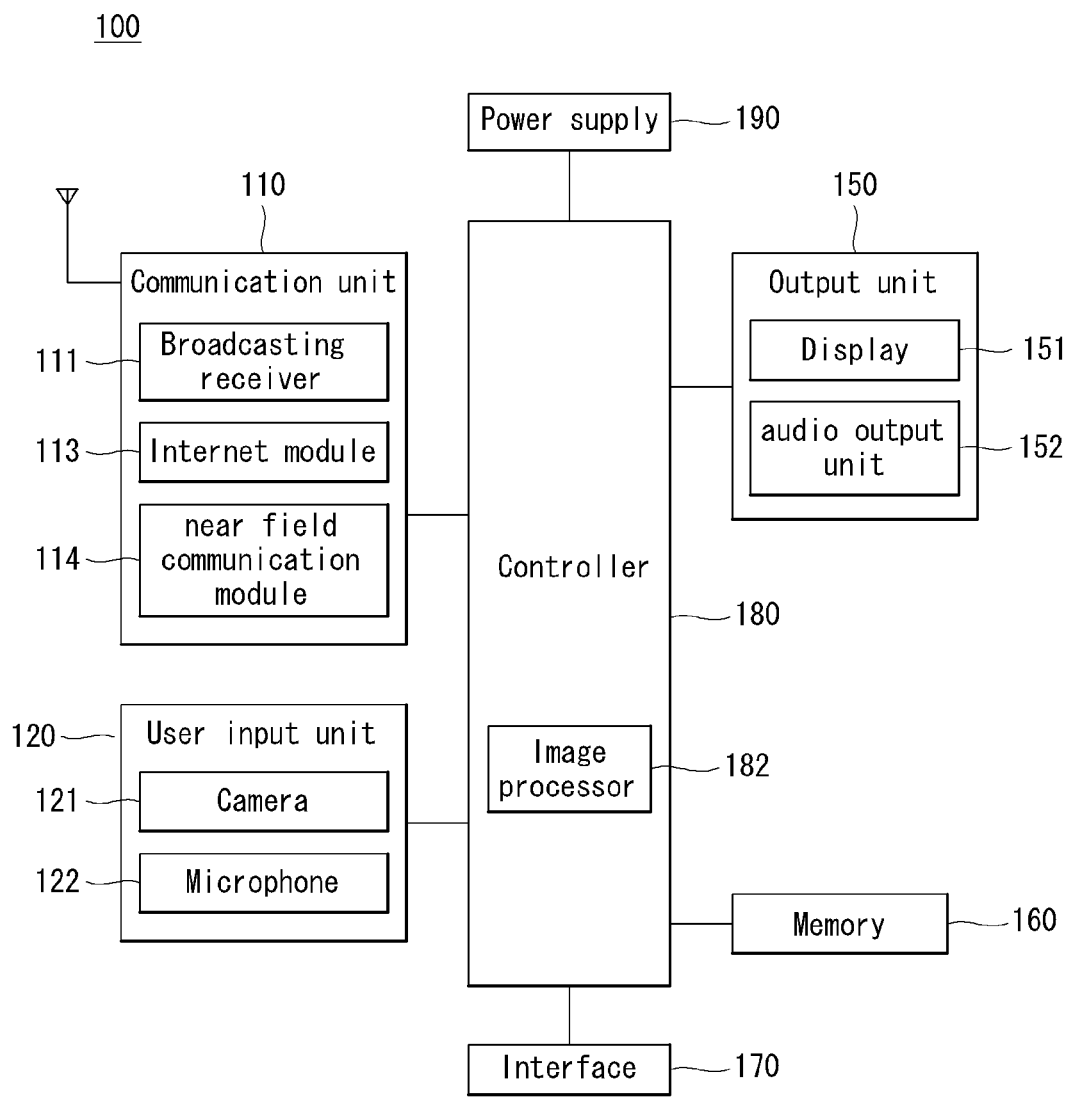
FIG. 1 is a block diagram illustrating an electronic device according to an embodiment of this document.

The electronic device described in the specification may be a mobile terminal such as a cellular phone, a smart phone, a laptop computer, a digital broadcasting terminal, personal digital assistants (PDA), a portable multimedia player (PMP), a navigation system and so on. Also, the electronic device may be a stationary device such as a television, a personal computer, and so on. FIG. 1 is a block diagram of an electronic device according to an embodiment of this document.

As shown, an electronic device 100, such as, for example, a display device, may include a communication unit 110, a user input unit 120, an output unit 150, a memory 160, an interface 170, a controller 180, and a power supply 190. Not all of the components shown as shown in FIG. 1 may be essential parts and the number of components included in the electronic device 100 may be varied.

The communication unit 110 may include at least one module that enables communication between the electronic device 100 and a communication system or between the electronic device 100 and another device. For example, the communication unit 110 may include a broadcasting receiving module (broadcasting receiver) 111, an Internet module 113, and a near field communication module 114.

The broadcasting receiving module 111 may receive broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal of a data broadcasting signal.

The broadcasting related information may be information on a broadcasting channel, a broadcasting program or a broadcasting service provider, and may be provided even through a communication network.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. The broadcasting signals and/or broadcasting related information received through the broadcasting receiving module 111 may be stored in the memory 160.

The Internet module 113 may correspond to a module for Internet access and may be included in the electronic device 100 or may be externally attached to the electronic device 100.

The near field communication module 114 may correspond to a module for near field communication. Further, Bluetooth®, radio frequency identification (RFID), infrared data association (IrDA), ultra wideband (UWB) and/or ZigBee® may be used as a near field communication technique.

The user input unit 120 is used to input an audio signal or a video signal and may include a camera 121 and a microphone 122.

The camera 121 may process image frames of still images or moving images obtained by an image sensor in a video telephony mode or a photographing mode. The processed image frames may be displayed on a display 151. The camera 121 may be a 2D or 3D camera. In addition, the camera 121 may be configured in the form of a single 2D or 3D camera or in the form of a combination of the 2D and 3D cameras.

The image frames processed by the camera 121 may be stored in the memory 160 or may be transmitted to an external device through the communication unit 110. The electronic device 100 may include at least two cameras 121.

The microphone 122 may receive an external audio signal in a call mode, a recording mode or a speech recognition mode and process the received audio signal into electric audio data. The microphone 122 may employ various noise removal algorithms for removing or reducing noise generated when the external audio signal is received.

The output unit 150 may include the display 151 and an audio output module 152.

The display 151 may display information processed by the electronic device 100. The display 151 may display a user interface (UI) or a graphic user interface (GUI) relating to the electronic device 100. In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display. The transparent display may include a transparent liquid crystal display. The rear structure of the display 151 may also be of a light transmissive type. Accordingly, a user may see an object located behind the body of terminal through the transparent area of the terminal body, occupied by the display 151.

The electronic device 100 may include at least two displays 151. For example, the electronic device 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display 151.

The audio output module/unit 152 may output audio data received from the radio communication unit 110 or stored in the memory 160. The audio output module 152 may output audio signals related to functions, such as a call signal incoming tone and a message incoming tone, performed in the electronic device 100.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least one of a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The electronic device 100 may also operate in relation to a web storage performing the storing function of the memory 160 on the Internet.

The interface 170 may serve as a path to all external devices connected to the electronic device 100. The interface 170 may receive data from the external devices or power and transmit the data or power to internal components of the electronic device 100 or transmit data of the electronic device 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The controller 180 may control overall operations of the electronic device 100. For example, the controller 180 may perform control and processing for voice communication. The controller 180 may also include an image processor 182 for pressing image, which will be explained later.

The power supply 190 receives external power and internal power and provides power required for each of the components of the electronic device 100 to operate under the control of the controller 180.

Various embodiments described in this document can be implemented in software, hardware or a computer readable recording medium. According to hardware implementation, embodiments of this document may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180 in some cases.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Hereinafter, a method of controlling an electronic device according to an embodiment of this document will be described in connection with FIGS. 1 and 2.

Figure 2:
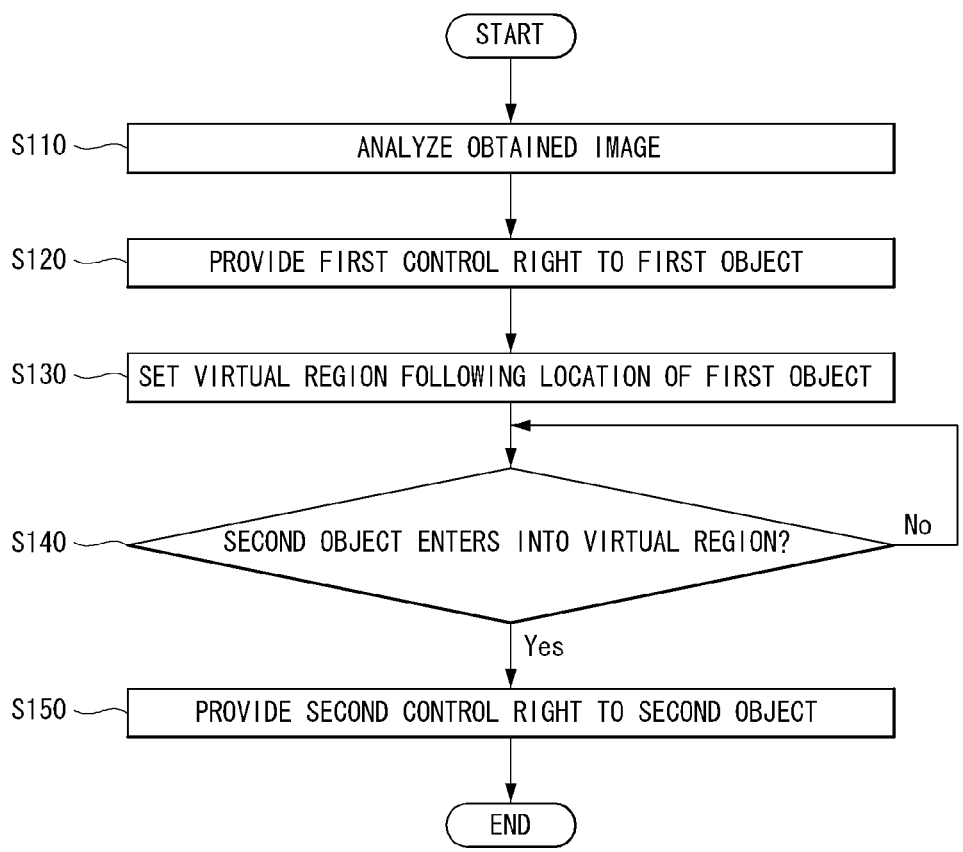
FIG. 2 is a flowchart illustrating a method of controlling an electronic device according to an embodiment of this document.

FIG. 2 is a flowchart illustrating a method of controlling an electronic device according to an embodiment of this document.

The controller 180 of the electronic device 100 analyzes an image captured by the camera 121 (S110). Specifically, the image processor 182 of the controller 180 analyzes the captured image to trace the location of an object such as each body part of a user.

For example, the image processor 182 senses a skin tone of the user positioned in front of the camera 121 area to recognize the user's body part corresponding to the skin tone and to trace the location of the body part. In general, skin tones of human face and hands are exposed as is. Further, a human face has a left and right symmetrical shape, and both eyes are relatively dark in general. The user's face may be recognized by such characteristic color patterns. Further, an object that is relatively freely movable within a predetermined radius of the face and has a smaller size than that of the face may be considered as a hand. A hand may be considered to have a lower skin tone when making a fist than when being opened. Further, a case where a portion considered as a hand alternately includes skin tone zones and non-skin tone zones may be considered as when the hand is opened.

The above image analysis method of recognizing a user's body part by sensing his or her skin tone and of tracing the location of the body part is merely an example of various image analysis methods that may be performed by the image processor 182. The embodiments of this document are not limited thereto, and other various image analysis methods may be carried out by the image processor 182.

For example, the controller 180 may trace trajectories of objects included in the obtained image and may analyze whether the trajectories form a predetermined trajectory. In a case where a user is included in the obtained image, the controller 180 may trace a location of a user's body part to recognize a specific gesture of the user.

The camera may be integrally provided with the electronic device 100 to capture an external object or may be provided separately from the electronic device 100 to transfer captured images of objects to the electronic device 100. According to an embodiment, the camera 121 may include a 2D camera, a 3D camera, or a combination thereof. Further, even though a single camera is shown in each of the figures for convenience of description, a plurality of cameras may also be provided.

When the controller 180 analyzes an image, an analysis of a 2D image captured by a 2D camera may be performed faster than an analysis of depth data captured by a 3D camera (hereinafter, referred to as "3D image"). However, analysis results of the 2D image show some shortcomings, such as being affected a lot by surrounding lights, a difficulty recognizing colors when surrounding lights are changed, or a shadow of an object being determined to be the same as the object.

The 3D image analysis may overcome such shortcomings of the 2D image analysis, but may cause an increase in data throughput and as a result reduced data processing rate.

3D cameras capable of 3D capturing may include, but not limited to, stereoscopic cameras, structural light cameras, and TOF (Time of Flight) cameras.

A stereoscopic camera may obtain a stereoscopic image by using two capturing lenses with a predetermined distance therebetween. The two lenses interoperate with each other in focus and exposure. The stereoscopic camera allows an object to be viewed as a stereoscopic image due to binocular parallax between the two lenses. A structural light camera radiates a infrared ray to an object and analyzes a scattering pattern of the reflected infrared ray to obtain information on a depth to the object.

A TOF camera obtains a stereoscopic image by measuring a time that it would take a light beam radiated to an object to come back. For example, as an object is away from the camera, a travelling time of a light beam increases, and as the object is close to the camera, the travelling time of the light beam decreases. Thus, calculation of the travelling times of light beams may measure distances to the object, and combination of the measured distances may obtain a stereoscopic image. The TOF camera may be provided with an illumination device for illuminating the object with light.

In the electronic device 100 according to the embodiments of this document, a 2D image obtained by a 2D camera may be analyzed to increase image analysis speed, and a 3D image obtained by a 3D camera may be analyzed to increase accuracy of image analysis. According to an embodiment, a 2D image analysis and a 3D image analysis may be both performed on a 2D image and a 3D image.

When an analysis result of the obtained image shows that a trajectory of a first object is recognized as a predetermined control right obtaining trajectory, the controller 180 provides the first object with a control right (S120). Then, the controller 180 analyzes an image obtained by the camera 121 to trace the trajectory of the first object. When the trajectory of the first object corresponds to a predetermined trajectory, a function corresponding to the predetermined trajectory may be performed.

According to embodiments, the first object may include, but not limited to, a users' body part, such as an arm, a leg, a hand, a foot, or a finger, or a device owned by the user, such as a remote controller.

If the first object is a certain body part of the user, the controller 180 providing the body part with the first control right preferably means the controller 180 is activating a gesture user interface using the specific body part. In particular, if the body part is one of both hands, the provision of the first control right activates a one-hand user interface for the electronic device 100.

For example, if the electronic device 100 is a display device, the user may perform various functions, such as volume adjustment, channel adjustment, zoom-in, zoom-out, or light-and-shade adjustment for the display device by making a predetermined gesture with a hand or other body part or object provided with the control right.

When the gesture user interface using the user's specific body part is activated, the user may manipulate the electronic device 100 with a gesture made by the specific body part having the control right. Accordingly, the user may use the electronic device 100 more conveniently than when manipulating the electronic device 100 by using buttons on the electronic device 100 or a remote controller.

Figure 3:
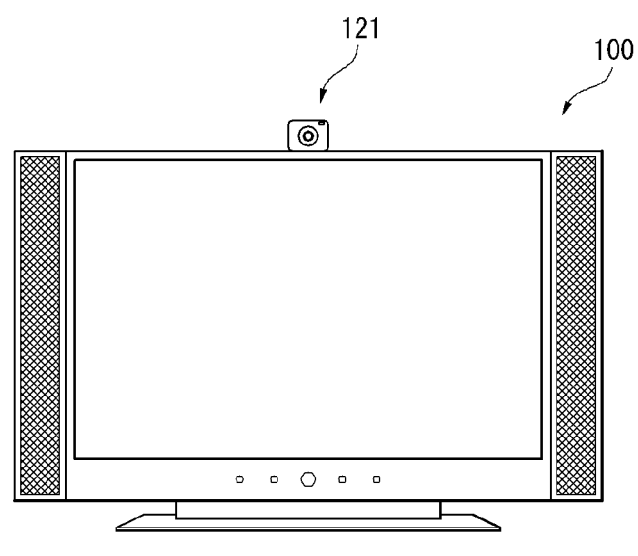
FIG. 3 illustrates an example of providing the first control right to the first object according to the method illustrated in connection with FIG. 2.
Figure 3:
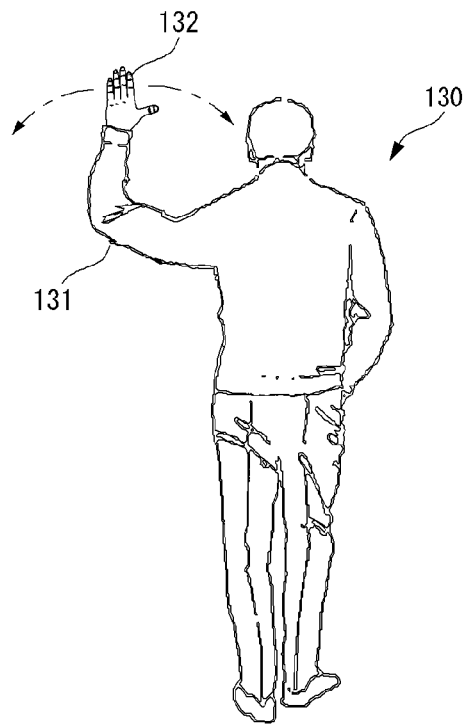

FIG. 3 illustrates an example of providing the first control right to the first object according to the method illustrated in connection with FIG. 2. It is assumed as shown in FIG. 3 that the first object is the left hand 132 of a user 130. Referring to FIG. 3, the user 130 may obtain a control right by making a gesture of waving a lower part 131 of his left arm in left and right directions with the left hand 132 opened. The gesture may be preset as an operation of providing the control right to the user 130 between the electronic device 100 and the user 130. Other various gesturers than that shown as shown in FIG. 3 may be set as the gesture of providing the control right to the user 130.

If the camera 121 is a 2D camera, the controller 180 may analyze a 2D image of the user obtained by the camera 121 to recognize the user's gesture, and if the camera 121 is a 3D camera, the controller 180 may analyze a 3D image of the user obtained by the camera 121 to recognize the user gesture.

Figure 4:
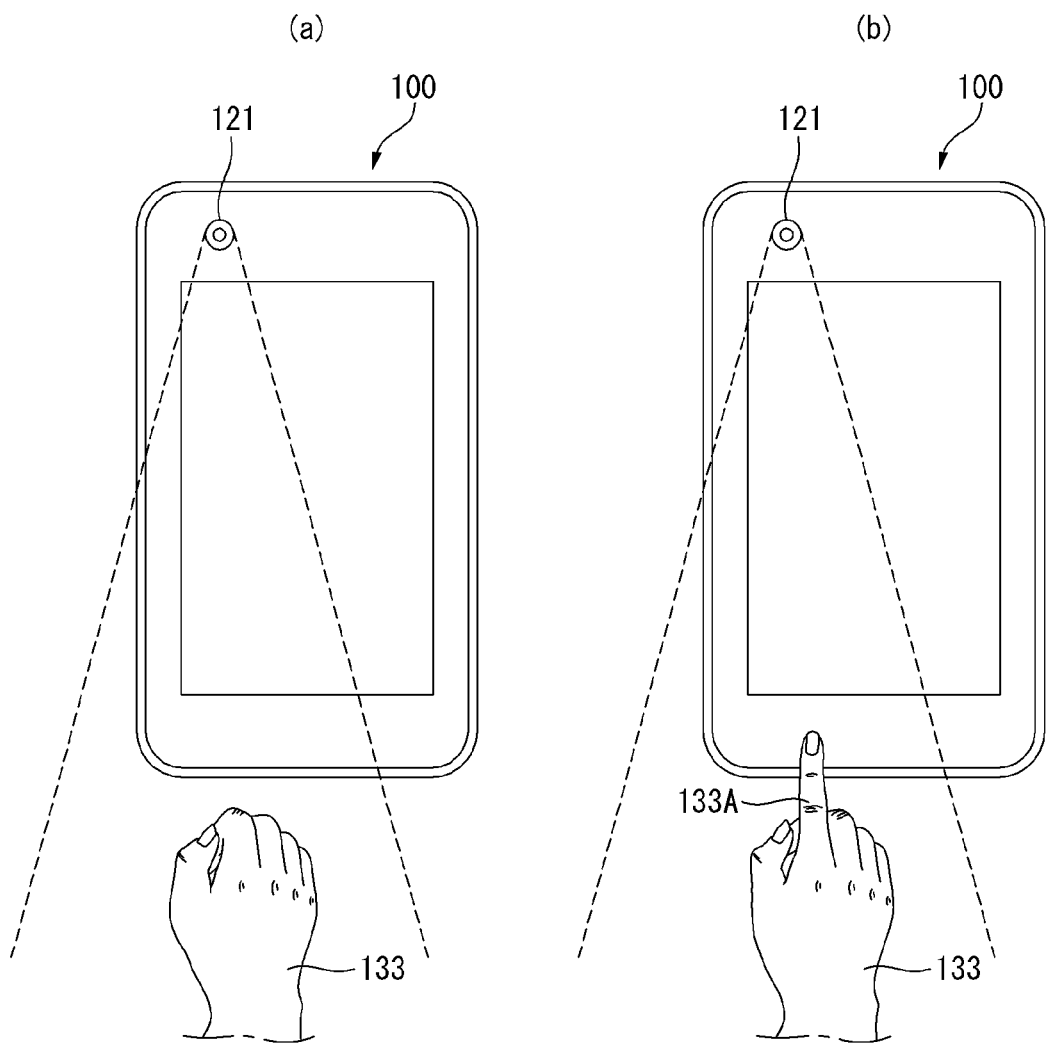
FIG. 4 illustrates an example of providing the first control right to the first object according to the method illustrated in connection with FIG. 2.

FIG. 4 illustrates an example of providing the first control right to the first object according to the method illustrated in connection with FIG. 2. Referring to FIGS. 3 and 4, the electronic device 100 may be a stationary electronic device, such as a TV 100 with a camera 121 or a mobile device, such as a mobile terminal 100 with a camera 121.

As shown in FIG. 4, when the user 130 changes gestures from (a) making a fist using his right hand 133 to (b) opening an index finger 133A with the other fingers of the right hand closed, the electronic device 100 may provide the index finger 133A of the user's right hand 133 with a control right to control the operation of the electronic device 100. For example, it is assumed as shown in FIG. 4 that the first object is the index finger 133A of the user's right hand 133. As described earlier, other various gestures than that shown as shown in FIG. 4 may be set as the gesture of providing the user 130 with the control right.

When the first object is granted the first control right, the controller 180 sets a virtual region that includes the first object and follows a location of the first object (S130). The phrase "follows a location of the first object" preferably means that when the first object is moved, the virtual region including the first object is also moved following the first object.

The virtual region may be a 3D space including the first object, and may have various shapes, such as a sphere or a rectangular parallelepiped. For example, the camera 121 used for obtaining an image may be a 3D camera that may obtain depth data for an external object. The virtual region may be a 2D region including the first object as viewed from the camera 121 and may have various shapes, such as a circle or a rectangle. The camera 121 used for obtaining an image may be a 2D that may obtain a 2D image for an external object.

When the virtual region is set, the controller 180 determines whether a second object enters into the virtual region (S140). If the second object enters into the virtual region, the controller 180 provides a second control right to the second object (S150). If the second object is a predetermined body part of the user, the controller 180 providing the second control right to the predetermined body part preferably means the controller 180 is activating a gesture user interface by that predetermined body part.

The controller 180 may provide the control right to the second object while maintaining the first control right provided to the first object. If the first object is one of the user's two hands and the second object is the other hand of the same user, this preferably means that the controller 180 activates both-hand user interface for the electronic device 100. That is, the user can use the gestures made by his/her both hands having the control rights to control the operation of the electronic device 100.

As a variation, if the first object is a predetermined body part of a first user and the second object is a predetermined body part of a second user different from the first user, this preferably means that the controller 180 adds the second user as a person authorized to control the electronic device 100 in addition to the first user. Then, the first and second users both may exercise the control rights on the electronic device 100 and use the gestures to control the electronic device 100 at a given time.

For example, if the electronic device 100 is a display device, the user may perform various functions, such as zoom-in, zoom-out, volume adjustment, channel adjustment, or light-and-shadow adjustment for the display device by making a predetermined gesture using both hands of the same user or different users granted the control right.

If the electronic device 100 is a surveillance camera that captures and records a certain area, the user may magnify or reduce an area to be captured by making a predetermined gesture using his both hands and may control a process of playing a recorded image.

In one example, where the second control right is provided to the second object, the controller 180 may inactivate or relinquish the first control right provided to the first object while the second control right is provided to the second object. For example, if the first object is one of user's both hands and the second object is the other hand of the user, the controller 180 can switch the hand used for the one-hand user interface. In another example, if the first object is a specific body part of the first user and the second object is a specific body part of the second user, the controller 180 can change a person authorized to control the electronic device 100 from the first user to the second user.

Figure 5:
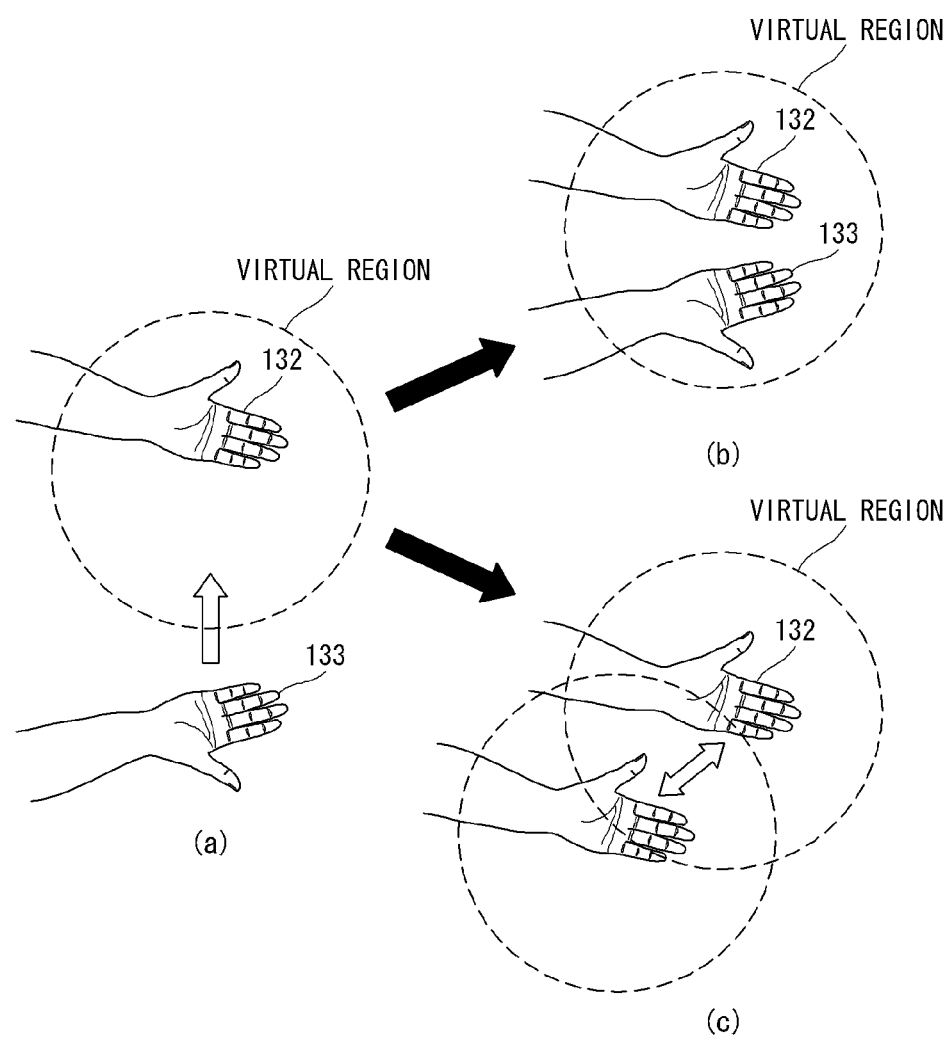
FIG. 5 illustrates an example of providing the second control right to the second object and an example where a virtual region including the first object follows the first object according to the method illustrated in connection with FIG. 2.

FIG. 5 illustrates an example of providing the second control right to the second object and an example where a virtual region including the first object follows the first object according to the method illustrated in connection with FIG. 2. As shown in FIG. 5, the first object is the left hand 132 of the user and the second object is the right hand 133 of the same user.

Referring to (a) of FIG. 5, a virtual region which is a spherical 3D space and includes the left hand 132 is set around the user's left hand having obtained the first control right for the electronic device 100, and it can be recognized that the user moves his right hand 133 into the virtual region.

Referring to (b) of FIG. 5, when the user's right hand 133 is moved and entered into the virtual region, the controller 180 may provide the second control right to the right hand 133. The controller 180 may activate a both-hand gesture user interface for the electronic device 100 by maintaining the control right provided to the left hand 132 or may inactivate the control right provided to the left hand 132 to change the hand used for a gesture user interface from the left hand to the right hand.

The controller 180 may set the virtual region from a time point of provision of the control right to the left hand 132. Then, after maintaining the setting of the virtual region during only a predetermined time period, the controller 180 may release the setting of the virtual region.

For example, in a case where the user does not move the right hand 133 to the virtual region within the predetermined time period, this may mean that the user does not intend to activate the both-hand gesture user interface where both hands of the user can control the electronic device 100. Also, if the user moves the right hand 133 to the virtual region to activate the both-hand user interface within the predetermined time period, the virtual region may be utilized as a user's interfacing space. The time of maintaining the setting of the virtual region may be predetermined upon manufacture of the electronic device 100 or determined by the user.

Also, in a case where a trajectory of the left hand 132 is equal to a predetermined trajectory after a control right has been provided to the left hand 132, that is, when the user makes a predetermined gesture using the left hand 132, the controller 180 may set a virtual region. Once a predetermined time elapses after the virtual region has been set, the controller 180 may release the setting of the virtual region. A reason for this has been described above.

Referring to (c) of FIG. 5, it can be seen that the virtual region including the left hand 132 follows the movement of the left hand 132 while maintaining the same shape. For instance, the virtual region set around the left hand 132 is moved as the left hand 132 moves. As a variation, unlike that shown in (c) of FIG. 5, the virtual region may be set as a fixed region (in space) including the left hand 132 at the time of setting the virtual region so that the virtual region may not move even though the left hand 132 moves.

Figure 6:
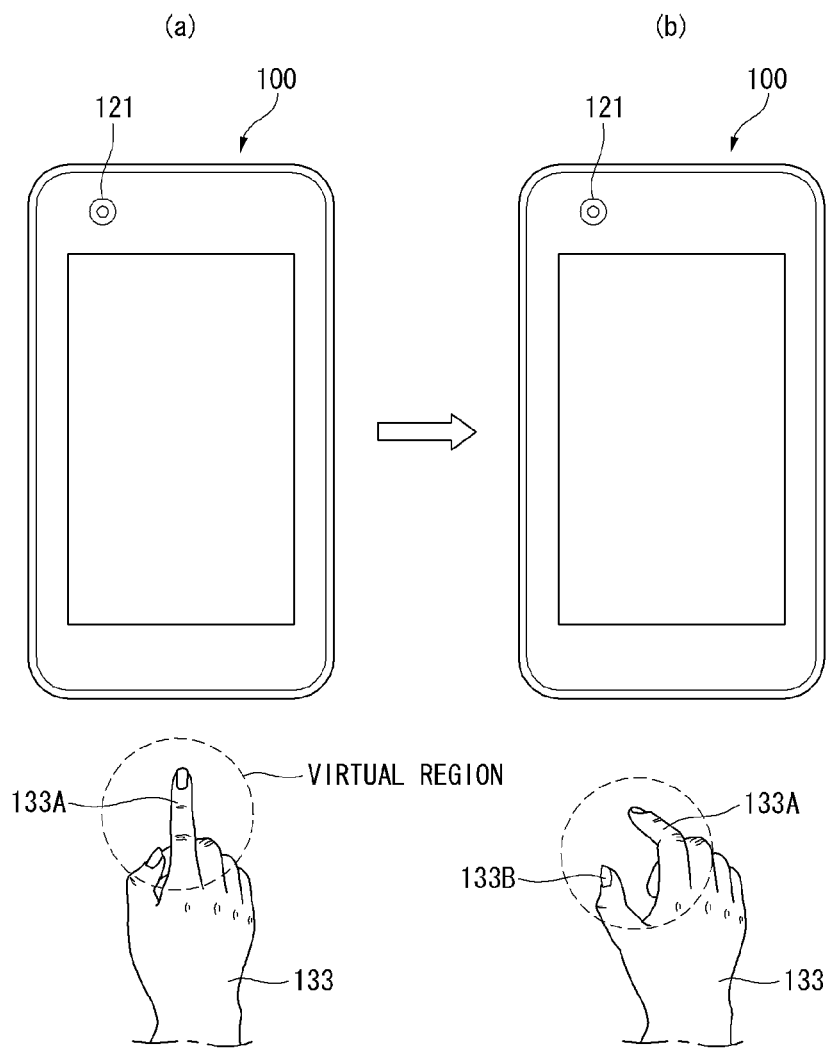
FIG. 6 illustrates an example of providing the second control right to the second object according to the method illustrated in connection with FIG. 2.

FIG. 6 illustrates an example of providing the second control right to the second object according to the method illustrated in connection with FIG. 2. As shown in FIG. 6, the first object is the index finger 133A of a user's right hand 133, and the second object is the thumb 133B of the same user's right hand 133.

Referring to FIG. 6, a virtual region which is, e.g., a spherical 3D space and includes the index finger 133A of the right hand 133 is set around the index finger 133A of the right hand 133 granted the first control right for the electronic device 100. It can be seen that the thumb 133B of the right hand 133 enters into the virtual region when the user opens the thumb 133B of his right hand 133.

Then, the controller 180 may provide the second control right to the thumb 133B of the right hand 133. The controller 180 may activate the gesture user interface using the index finger 133A and the thumb 133B for the electronic device 100 by maintaining the control right provided to the index finger 133A of the right hand 133 or may activate the gesture user interface using only the index finger 133A by inactivating the control right provided to the index finger 133A.

As described above in connection with FIG. 5, the controller 180 may release the setting of the virtual region when a control right is provided to the thumb 133B after having maintained the virtual region during a predetermined time period. Also, as shown in (c) of FIG. 5, the virtual region including the index finger 133A may follow the movement of the index finger 133A while generally maintaining the same shape or may also be set as a region whose location is fixed and which includes the index finger 133A at the time of setting the virtual region.

It has been described in connection with FIG. 6 that the thumb 133B and the index finger 133A of the user's right hand 133 may be used for the gesture user interface of the electronic device 100 according to an embodiment of this document. However, the embodiments of this document are not limited thereto. For example, any two fingers of the right hand 133, thumb and index finger of the left hand 132, any two fingers of the left hand 132, or one finger of the left hand 132 and one finger of the right hand 133 may also be used for the gesture user interface of the electronic device 100 according to an embodiment of this document.

Although not shown in FIG. 2, the controller 180 may display the first object granted the first control right, the virtual region set based on the location of the first object, and the second object approaching the vertical region on the display 151 of the electronic device 100. The second object may be an object preset as a candidate that may obtain a control right for the electronic device 100.

For example, the first object and the second object to which the controller 180 provides the control right may be a user's body parts. If the controller 180 determines whether to activate the both-hand gesture user interface for the electronic device 100, the first and second objects may be user's both hands. However, the embodiments of this document are not limited thereto. For example, the first and second objects may also be other body parts of the user, which have been preset to be capable of being used for obtaining the control right for the electronic device 100.

Figure 7:
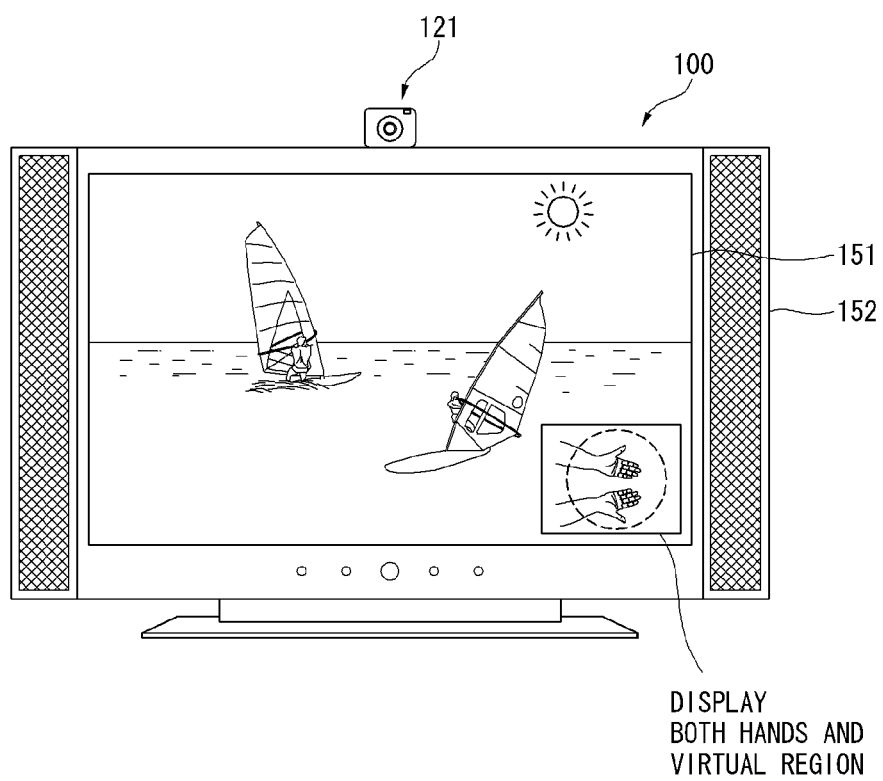
FIG. 7 illustrates an example of displaying the first and second objects and the virtual region on the electronic device in the middle of performing the method illustrated in connection with FIG. 2.

FIG. 7 illustrates an example of displaying the first and second objects and the virtual region on the electronic device in the middle of performing the method illustrated in connection with FIG. 2. FIG. 7 shows an image displayed on the display 151 of the electronic device 100 when the electronic device 100 is a display device, the user's left hand is the first object, and the user's right hand is the second object.

Referring to FIG. 7, it can be seen that the controller 180 displays the user's left and right hands which are the first object and the second object, respectively, and a virtual region to which the left and right hands have been entered. Although not shown in FIG. 7, the controller 180 may sequentially display steps in which the user's right hand enters into the virtual region on the display 151.

Also, the controller 180 may display the user's whole body so that the user's two hands and the virtual region are differentiated from the other body parts. However, the embodiments of this document are not limited thereto. For example, the controller 180 may display the trajectory of the user's left hand, whether to obtain the first control right for the left hand, the virtual region set based on the first control right, and the trajectory of the user's right hand to obtain the second control right on the display 151 in various manners.

According to an embodiment, the controller 180 may display a text message notifying whether control rights have been provided to the first and second objects and whether the control rights have been inactivated on the display 151 of the electronic device 100 or may output a voice message notifying whether the control rights have been provided to the first and second objects and whether the control rights have been inactivated through the audio output module 152 of the electronic device 100.

Figure 8:
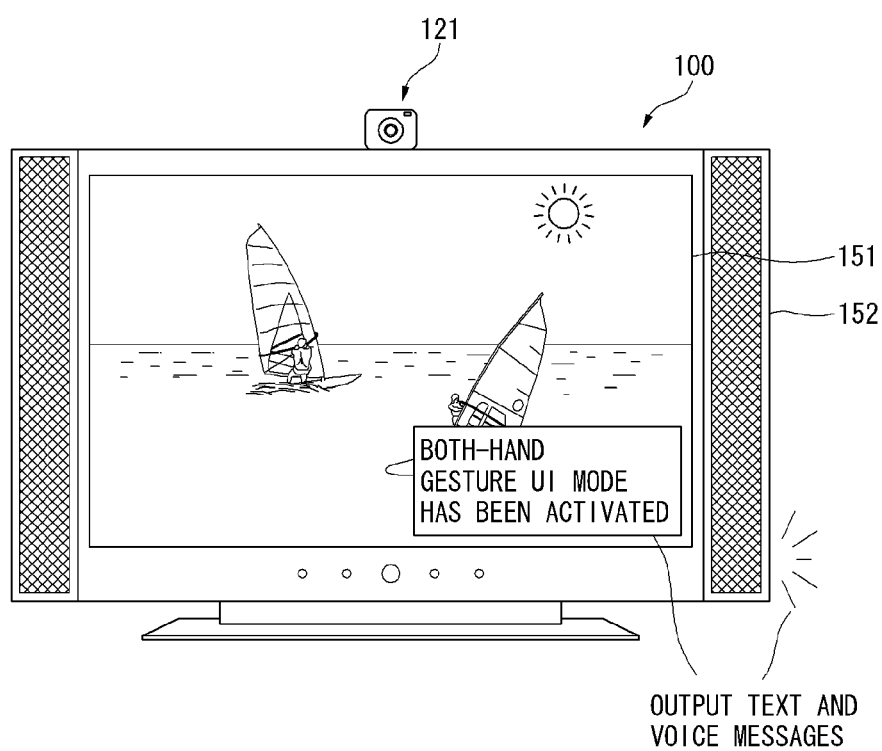
FIG. 8 illustrates that the electronic device outputs a result of activation of a gesture user interface according to the method illustrated in connection with FIG. 2.

FIG. 8 illustrates that the electronic device outputs a result of activation of a gesture user interface according to the method illustrated in connection with FIG. 2. As shown in FIG. 8, the electronic device 100 is a display device, and a message notifying that a gesture user interface using the user's two hands has been activated is displayed.

Referring to FIG. 8, the controller 180 may output a message saying "both-hand gesture UI mode has been activated" through the display 151 in the form of a text message or through the audio output module 152 in the form of a voice message. Although not shown in FIG. 8, when the gesture user interface is inactivated or object used for the gesture user interface is changed, the controller 180 may output a text or voice message corresponding thereto.

It has been described in connection with FIGS. 7 and 8 that messages for the gesture user interface are displayed on the display 151 assuming that the electronic device 100 may be a TV. However, such messages may also be displayed for any type of electronic device 100, e.g., when the electronic device 100 is a mobile terminal according to an embodiment of this document.

Hereinafter, examples where the controller 180 of the electronic device 100 controls setting of a gesture user interface using a specific body part of a user of the electronic device 100 will be described.

Figure 9:
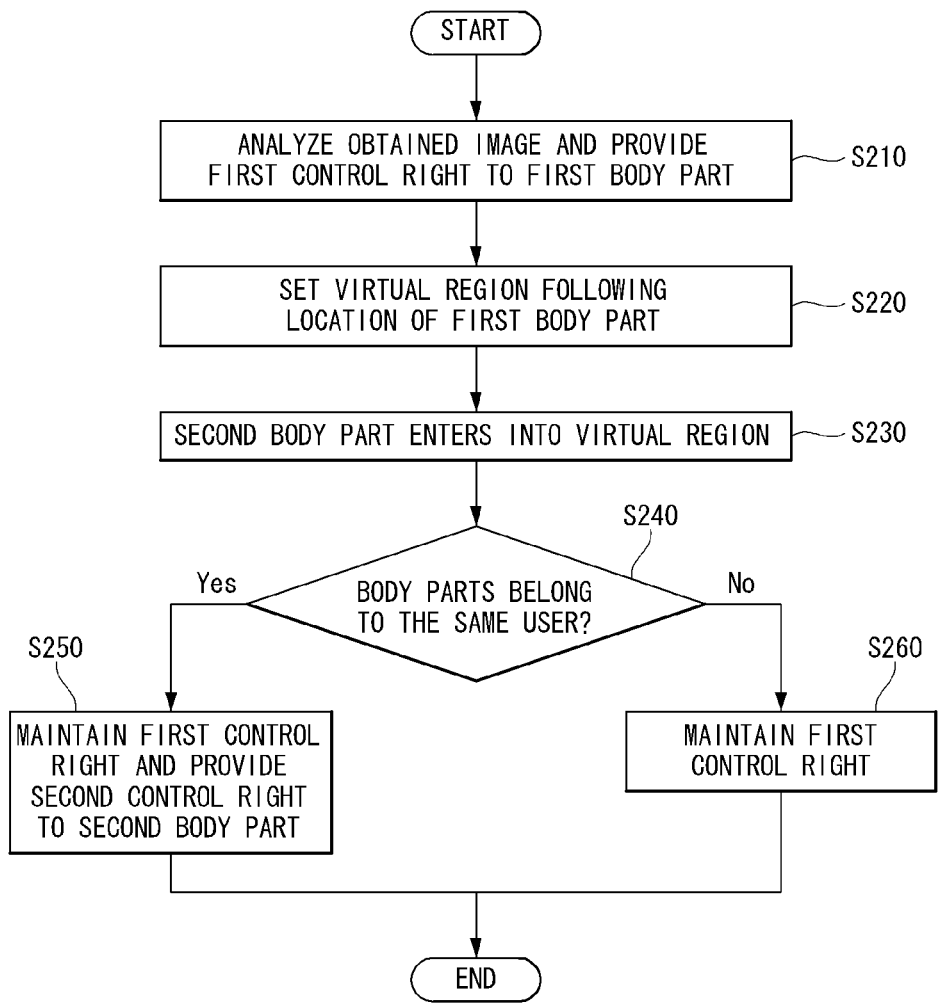
FIG. 9 is a flowchart illustrating a method of controlling an electronic device according to an embodiment of this document.

FIG. 9 is a flowchart illustrating a method of controlling an electronic device according to an embodiment of this document. The method of controlling an electronic device will now be described with reference to FIGS. 1 and 9.

The controller 180 of the electronic device 100 analyzes an image obtained by the camera 121, provides a first control right to a first body part of a user (S210), and sets a virtual region following the location of the first body part (S220). Then, if an image analysis result shows that a second body part enters into the virtual region (S230), the controller 180 determines whether the first and second body parts belong to the same user (S240).

If the first and second body parts belong to the same user, the controller 180 may provide a second control right to the second body part. In this case, the controller 180 may maintain the first control right provided to the first body part (S250). This preferably means that a multi-gesture user interface using any one of the first and second body parts is activated for the electronic device 100.

However, unlike step S250 in FIG. 9, as a variation, the controller 180 may inactivate the first control right provided to the first body part while providing the control right to the second body part. This preferably means that a gesture user interface using the second body part is activated for the electronic device 100.

If the first and second body parts do not belong to the same user at step S240, the controller 180 maintains the first control right provided to the first body part but does not provide a control right to the second body part (S260). As a variation, however, the controller 180 may also provide a control right to the second body part. This preferably means that each of a plurality of different users becomes a person authorized to control the electronic device 100.

Also, still as another variation to step S260 in FIG. 9, the controller 180 may inactivate the first control right for the first body part and may provide the second control right to the second body part. This means that a person authorized to control the electronic device 100 is changed from the user of the first body part to the user of the second body part.

Figure 10:
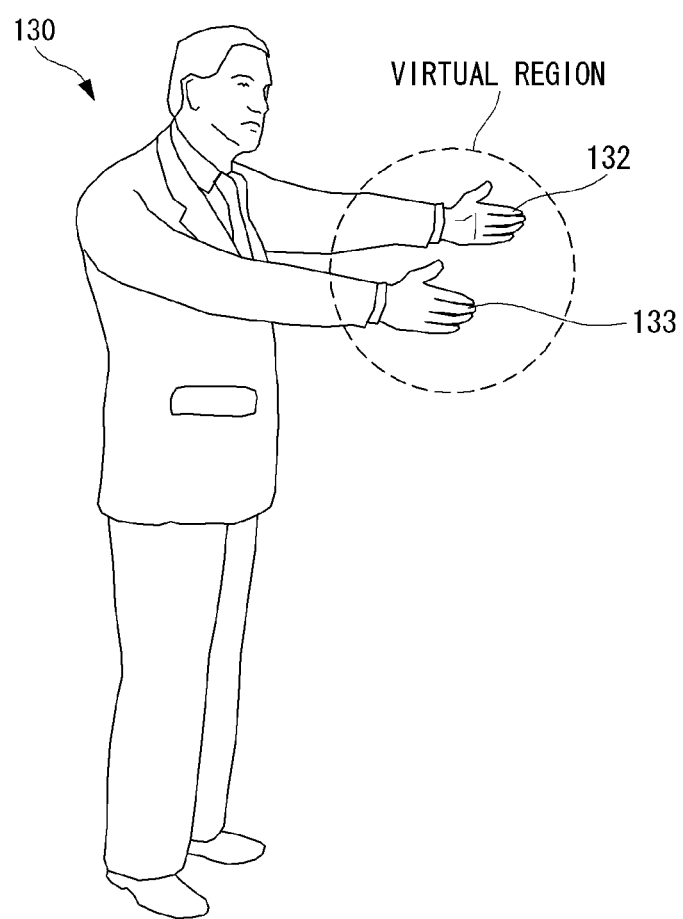
FIG. 10 illustrates an example where a virtual region is formed around a first body part of a user granted a first control right and a second body part of the user enters into the virtual region.

FIG. 10 illustrates an example where a virtual region is formed around a first body part 132 of a user 130 granted a first control right and a second body part 133 of the user 130 enters into the virtual region.

Referring to FIG. 10, the first control right is provided to the left hand 132 of the user 130, a spherical 3D virtual region is formed around the left hand 132, and the right hand 133 of the user 130 has entered into the virtual region. Since the left hand 132 and the right hand 133 positioned in the virtual region belong to the same user 130, the controller 180 provides the second control right to the right hand of the user 130. However, it is optional whether to maintain the control right to the left hand 132.

Depending on whether to maintain the control right to the left hand 132, a gesture user interface mode for the electronic device 100 may become a both-hand gesture user interface mode or a one-hand gesture user interface mode. This has been described above, and thus, repetitive description thereof will be omitted.

Figure 11:
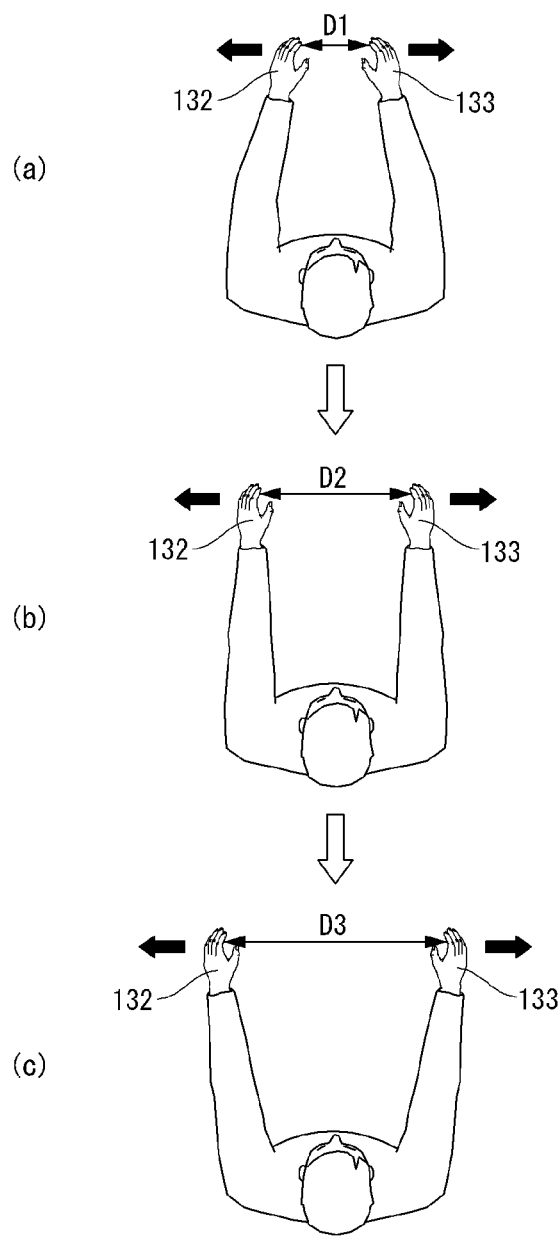
FIG. 11 illustrates an exemplary gesture of the user zooming in the screen while a both-hand gesture user interface is activated.

FIG. 11 illustrates an exemplary gesture of the user zooming in the screen while a both-hand gesture user interface is activated. Referring to FIG. 11, in a case where a distance between his two hands 132 and 133 increases by D1→D2→D3 by the user opening his two arms from (a) through (b) to (c), the controller 180 of the electronic device 100 may recognize this gesture as zooming in the screen. However, this gesture is merely an example of performing a predetermined zoom-in operation, and the embodiments of this document are not limited thereto. For example, other various gestures than increasing the distance between the two hands may also be used for zooming in the screen.

Figure 12:
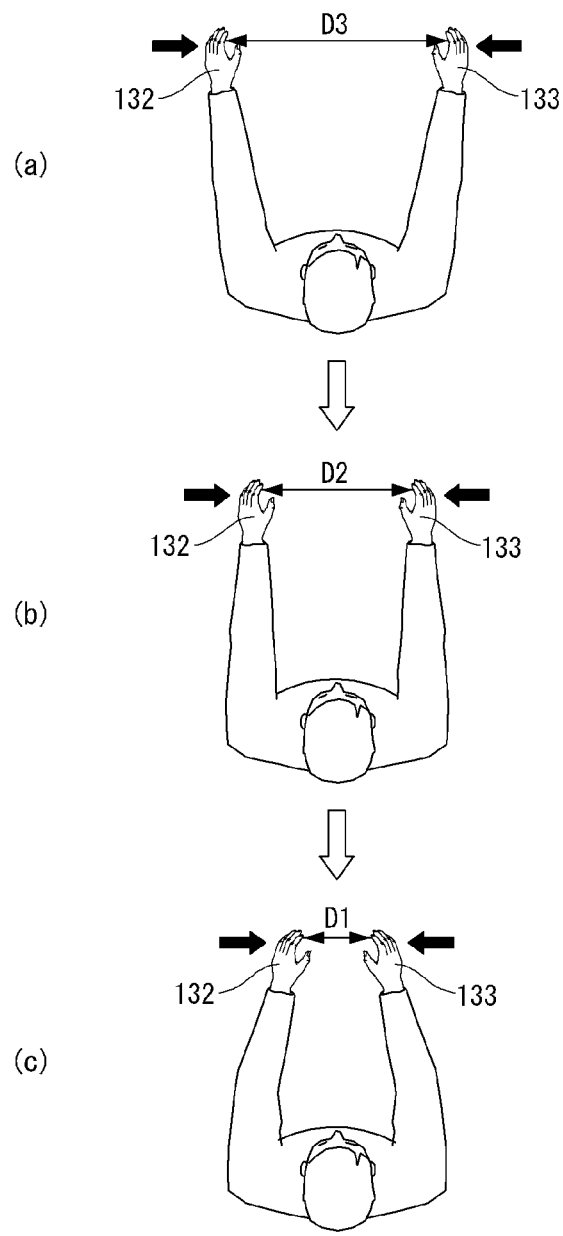
FIG. 12 illustrates an exemplary gesture of the user zooming out the screen while a both-hand gesture user interface is activated.

FIG. 12 illustrates an exemplary gesture of the user zooming out the screen while a both-hand gesture user interface is activated. Referring to FIG. 12, in a case where a distance between his two hands 132 and 133 decreases by D3→D2→D1 by the user putting his two arms together from (a) through (b) to (c), the controller 180 of the electronic device 100 may recognize this gesture as zooming out the screen. However, this gesture is merely an example of performing a predetermined zoom-out operation, and the embodiments of this document are not limited thereto. For example, other various gestures than decreasing the distance between the two hands may also be used for zooming out the screen.

Figure 13:
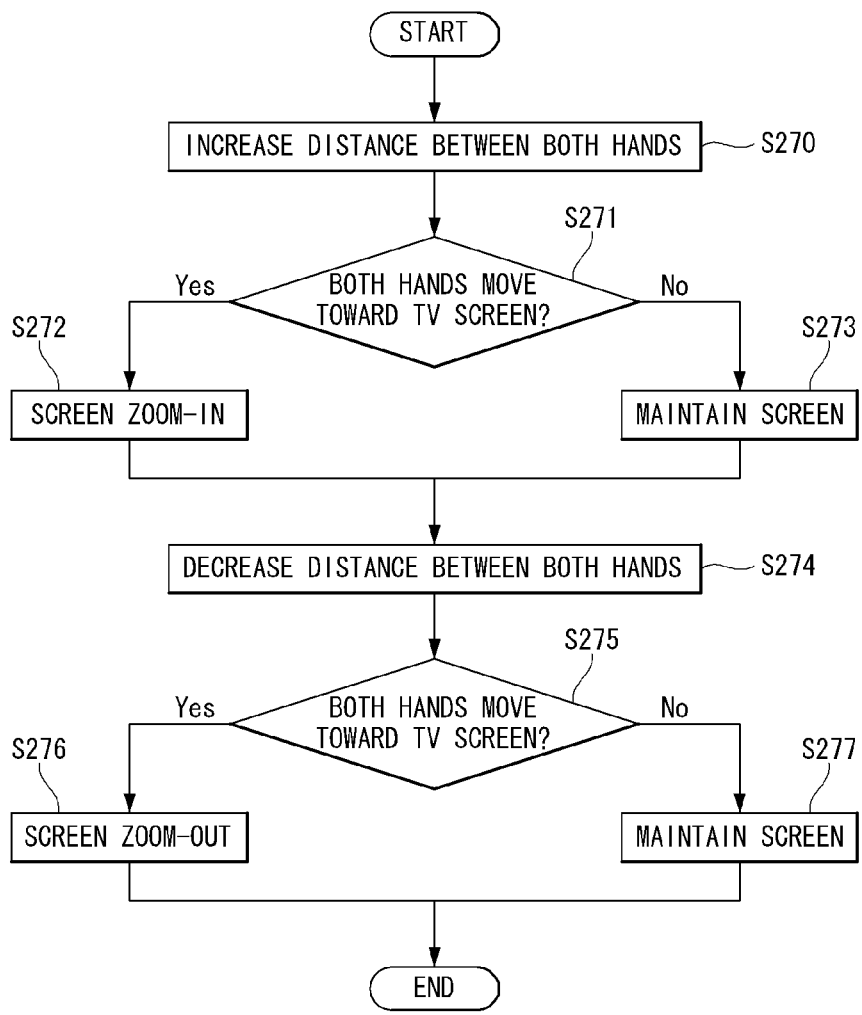
FIG. 13 is a flowchart illustrating a method of the electronic device recognizing a user's zoom-in gesture while a both-hand gesture user interface is activated.

FIG. 13 is a flowchart illustrating a method of the electronic device 100 recognizing a user's zoom-in gesture while a both-hand gesture user interface is activated. It is assumed in FIG. 13 that in the electronic device 100, a gesture of increasing a distance between the two hands is set as a zoom-in operation, and a gesture of decreasing the distance between the two hands is set as a zoom-out operation. Hereinafter, the electronic device 100 is assumed to be a TV and the method of recognizing the zoom-in gesture will be described with reference to the figures. However, these are mere examples and the invention fully encompasses other variations.

If the distance between the user's two hands 132 and 133 increases by the user opening his arms (S270), the controller 180 of the TV 100 analyzes the user's image captured by the camera 121 to recognize a variation in depth to the two hands 132 and 133 and, based on the variation in depth, determines whether a travelling direction of the two hands 132 and 133 with respect to the TV 100 is toward the screen of the TV 100 (S271).

Here, the "travelling direction of the two hands 132 and 133" may refer to a direction in which a middle point between the two hands 132 and 133 is moved respective of the screen of the TV 100. However, the embodiments of this document are not limited thereto. For example, the travelling direction of the two hands 132 and 133 may be an average travelling distance of the two hands 132 and 133 with respect to the screen of the TV 100. This may apply to FIG. 14 as well.

If the travelling direction of the two hands 132 and 133 is toward the screen of the TV 100, for example when the user makes a gesture of increasing the distance between the two hands by stretching his both hands 132 and 133 frontward, the controller 180 recognizes this as a gesture of zooming in the screen and accordingly performs a zoom-in operation (S272).

However, if the travelling direction of the two hands 132 and 133 is a direction away from the screen of the TV 100, for example when the user makes a gesture of increasing the distance between his both hands by pulling his hands 132 and 133 back, the controller 180 maintains the screen as is without recognizing this as a gesture of zooming in the screen (S273).

When recognizing a user's gesture of reducing the distance between the hands 132 and 133 after the user's gesture of increasing the distance the hands 132 and 133 has been recognized (S274), the controller 180 analyzes the user's image captured by the camera 121 to recognize a variation in depth to the two hands 132 and 133 and, based on the variation in depth, determines whether a travelling direction of the two hands 132 and 133 with respect to the TV 100 is toward the screen of the TV 100 (S275).

If the travelling direction of the two hands 132 and 133 is toward the screen of the TV 100, for example when the user makes a gesture of decreasing the distance between the two hands by stretching his both hands 132 and 133 frontward, the controller 180 recognizes this as a gesture of zooming out the screen and accordingly performs a zoom-out operation (S276).

However, if the travelling direction of the two hands 132 and 133 is a direction away from the screen of the TV 100, for example when the user makes a gesture of decreasing the distance between his both hands by pulling his hands 132 and 133 back, the controller 180 maintains the screen as is without recognizing this as a gesture of zooming out the screen (S277).

According to the method of recognizing the zoom-in gesture as shown in FIG. 13, although the user increases the distance between the hands 132 and 133 by stretching this both hands 132 and 133 toward the screen and then pulls back his hands 132 and 133 to decrease the distance between the hands 132 and 133, the controller 180 performs only the zoom-in operation but not zoom-out operation. This comes from the fact that a user of the electronic device 100 generally makes a zoom-in or zoom-out gesture with constant directivity. According to an embodiment, a direction for determining whether to perform a zoom-in or zoom-out operation may be set to be opposite to that considered in FIG. 13.

Figure 14:
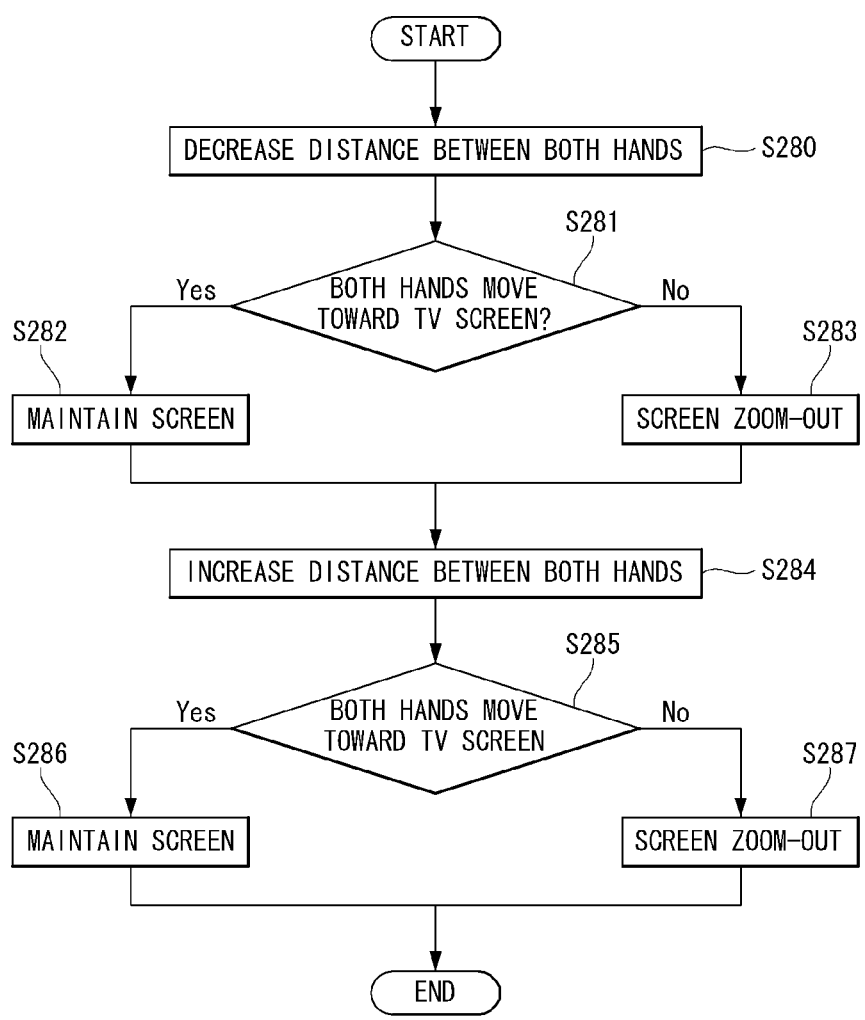
FIG. 14 is a flowchart illustrating a method of the electronic device recognizing a user's zoom-out gesture while a both-hand gesture user interface is activated.

FIG. 14 is a flowchart illustrating a method of the electronic device 100 recognizing a user's zoom-out gesture while a both-hand gesture user interface is activated. In contrast to FIG. 13, it is assumed in FIG. 14 that in the case of recognizing a gesture of varying the distance between the hands 132 and 133 while the travelling direction of the user's both hands 132 and 133 is a direction away from the screen of the TV 100, the electronic device 100 performs a zoom-in or zoom-out operation. Hereinafter, the electronic device 100 is assumed to be a TV and the method of recognizing the zoom-in gesture will be described with reference to the figures. However, these are merely examples and the invention fully encompasses other variations.

Upon recognizing a gesture of decreasing the distance between the two hands 132 and 133, the controller 180 of the TV 100 determines whether the two hands 132 and 133 move toward or opposite to the screen of the TV 100 (S281).

If the travelling direction of the two hands 132 and 133 is toward the screen of the TV 100, for example when the user makes a gesture of reducing the distance between the two hands while stretching his both hands 132 and 133, the controller 180 maintains the screen as is without recognizing this as a gesture of zooming out the screen (S282).

However, if the travelling direction of the two hands 132 and 133 is opposite to the screen of the TV 100, for example when the user makes a gesture of decreasing the distance between the two hands by pulling his hands 132 and 133 back, the controller 180 recognizes this as a gesture of zooming out the screen and performs a zoom-out operation (S283).

In the case of recognizing a user's gesture of increasing the distance between the two hands 132 and 133 after recognizing a user's gesture of decreasing the distance between the two hands 132 and 133 (S284), the controller 180 determines whether the travelling direction of the two hands 132 and 133 with respect to the screen of the TV 100 is toward the screen of the TV 100 (S285).

If the travelling direction of the two hands 132 and 133 is toward the screen of the TV 100, for example when the user makes a gesture of increasing the distance between the two hands while stretching his both hands 132 and 133, the controller 180 maintains the screen as is without recognizing this as a gesture of zooming in the screen (S286).

However, if the travelling direction of the two hands 132 and 133 is opposite to the screen of the TV 100, for example when the user makes a gesture of increasing the distance between the two hands by pulling his hands 132 and 133 back, the controller 180 recognizes this as a gesture of zooming in the screen and performs a zoom-in operation (S287).

According to the method of recognizing the zoom-in operation shown in FIG. 14, even though the user decreases the distance between the two hands 132 and 133 by pulling his hands 132 and 133 back in a direction away from the screen and then increases the distance between the two hands 132 and 133 by stretching the two hands 132 and 133, the controller 180 performs only the zoom-out operation but not the zoom-in operation. According to an embodiment, a direction for determining whether to perform the zoom-in or zoom-out operation may be set opposite to the direction considered in FIG. 14.

It has been described in connection with FIGS. 13 and 14 to neglect a zoom-out gesture inevitably entailed in a zoom-in gesture and a zoom-in gesture inevitably entailed in a zoom-out gesture in consideration of directivity of user's zoom-in and zoom-out operations. However, the embodiments of this document are not limited thereto, and other various methods may also be available to disregard unnecessary gestures.

For example, a method of considering the speeds of zoom-in and zoom-out gestures may be performed in order for the controller 180 to disregard unnecessary zoom-in and zoom-out gestures. Specifically, the controller 180 may disregard unnecessary gestures by considering a difference in speed between a zoom-in gesture and a zoom-out gesture entailed in the zoom-in gesture when a specific user attempts to zoom in the screen or by considering a difference in speed between a zoom-out gesture and a zoom-in gesture entailed in the zoom-out gesture when the user attempts to zoom out the screen.

Further, a method of considering a difference in time between a zoom-in gesture and a zoom-out gesture may be available in order for the controller 180 to disregard unnecessary zoom-in and zoom-out gestures. The controller 180 may disregard unnecessary gestures by considering a difference in time between a zoom-in gesture and a zoom-out gesture entailed in the zoom-in gesture when a specific user attempts to zoom in the screen or by considering a difference in time between a zoom-out gesture and a zoom-in gesture entailed in the zoom-out gesture when the user attempts to zoom out the screen.

Figure 15:
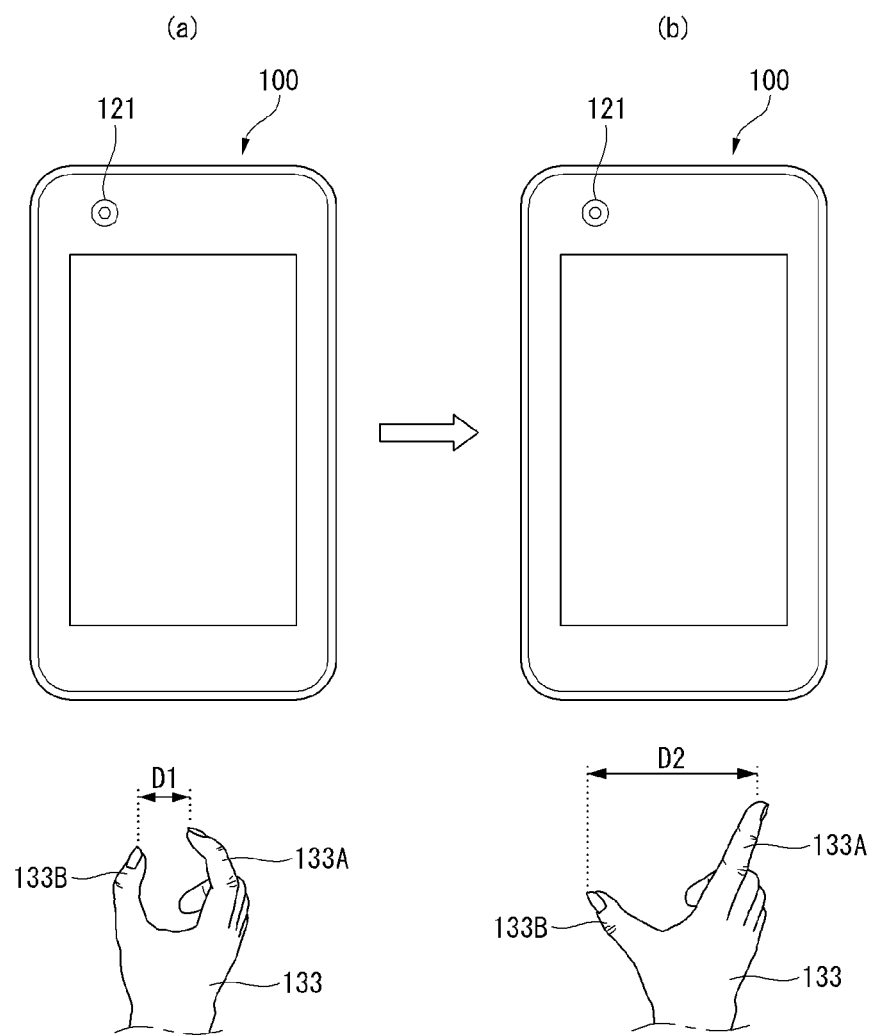
FIG. 15 illustrates an exemplary user's gesture of zooming in the screen while a gesture user interface using the thumb and index finger of user's right hand is activated.

FIG. 15 illustrates an exemplary user's gesture of zooming in the screen while a gesture user interface using the thumb 133B and index finger 133A of user's right hand 133 is activated. Referring to FIG. 15, when a distance between the thumb 133B and the index finger 133A increases from D1 to D2 by the user opening the thumb 133B and the index finger 133A (for example, from (a) to (b) in FIG. 15), the controller 180 of the electronic device 100 may recognize this as a gesture of zooming in the screen. However, the gesture is merely an example of a predetermined zoom-in gesture, and the embodiments of this document are not limited thereto. For example, other various gestures than the gesture of increasing the distance between the two fingers may be set as the zoom-in gesture.

Figure 16:
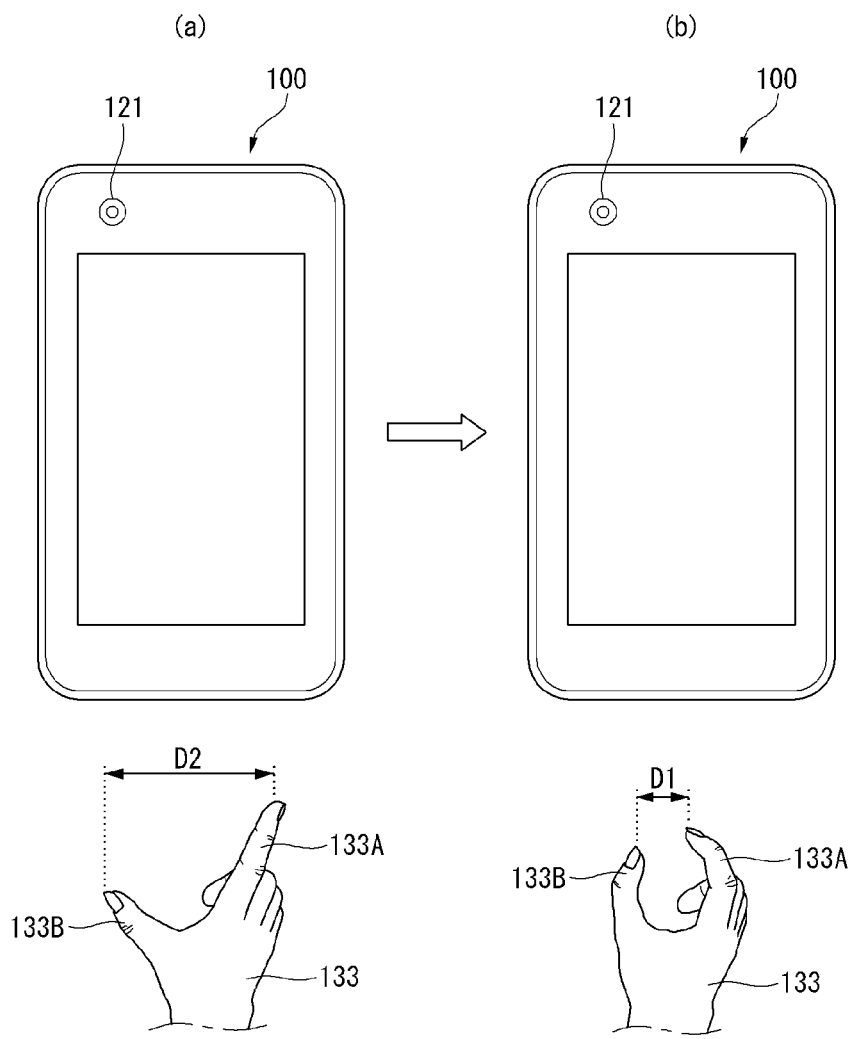
FIG. 16 illustrates an exemplary user's gesture of zooming out the screen while a gesture user interface using the thumb 133B and index finger of user's right hand is activated.

FIG. 16 illustrates an exemplary user's gesture of zooming out the screen while a gesture user interface using the thumb 133B and index finger 133A of user's right hand 133 is activated. Referring to FIG. 16, when a distance between the thumb 133B and the index finger 133A decreases from D2 to D1 by the user closing the thumb 133B and the index finger 133A (for example, from (a) to (b) in FIG. 16), the controller 180 of the electronic device 100 may recognize this as a gesture of zooming out the screen. However, the gesture is merely an example of a predetermined zoom-in gesture, and the embodiments of this document are not limited thereto. For example, other various gestures than the gesture of decreasing the distance between the two fingers may be set as the zoom-out gesture.

The methods of disregarding unnecessary gestures considering directivity of zoom-in and zoom-out gestures or a difference in speed or time between zoom-in and zoom-out gestures as described above in connection with FIGS. 13 to 14 may also apply to a user interface using the thumb 133B and the index finger 133A shown in FIGS. 15 and 16. This may be apparent to one of ordinary skill in the art based on those described with reference to FIGS. 15 to 16 and thus detailed description thereof will be omitted.

Figure 17:
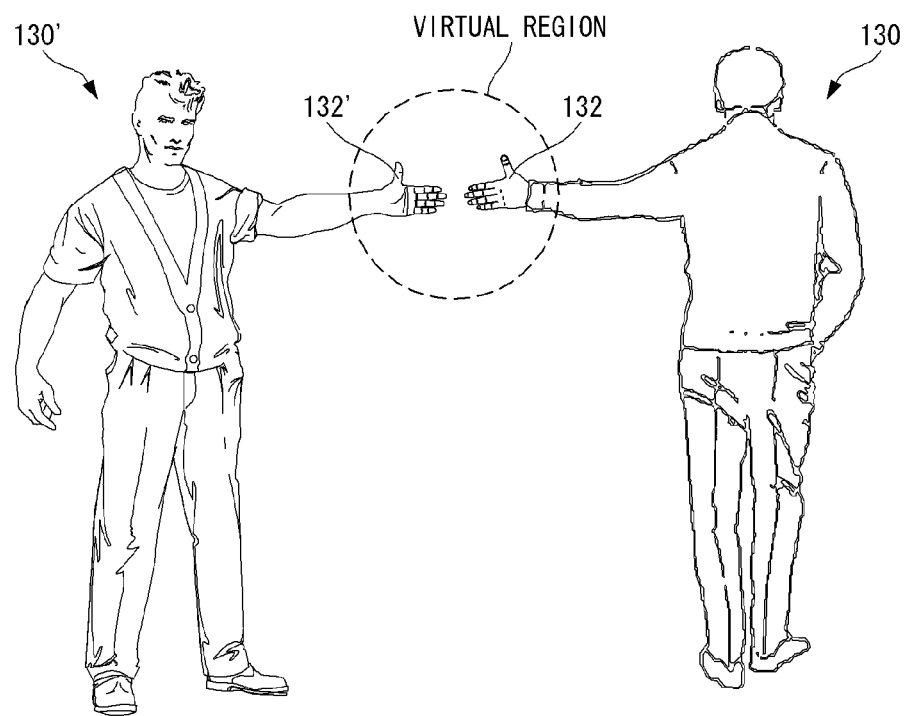
FIG. 17 illustrates an example where a body part of a second user enters into a virtual region set around a first body part of a first user which is granted a first control right.

FIG. 17 illustrates an example where a body part of a second user enters into a virtual region set around a first body part of a first user which is granted a first control right. Referring to FIG. 17, the first user 130 is a person whose left hand 132 is granted the control right for the electronic device 100, and the second user 130' is a different person to whom no control right for the electronic device 100 is granted.

Referring to FIG. 17, under the circumstance where a spherical 3D virtual region is set around the left hand 132 of the first user 130 that has been granted the first control right, the left hand 132' of the second user 130' enters into the virtual region. Depending on whether the first control right is maintained for the left hand 132 of the first user 130 and whether a control right is granted the left hand 132' of the second user 130', there may be a plurality of persons who are authorized to control the electronic device 100 or the persons may be changed to each other. This has been described above, and thus detailed description thereof will be omitted.

Figure 18:
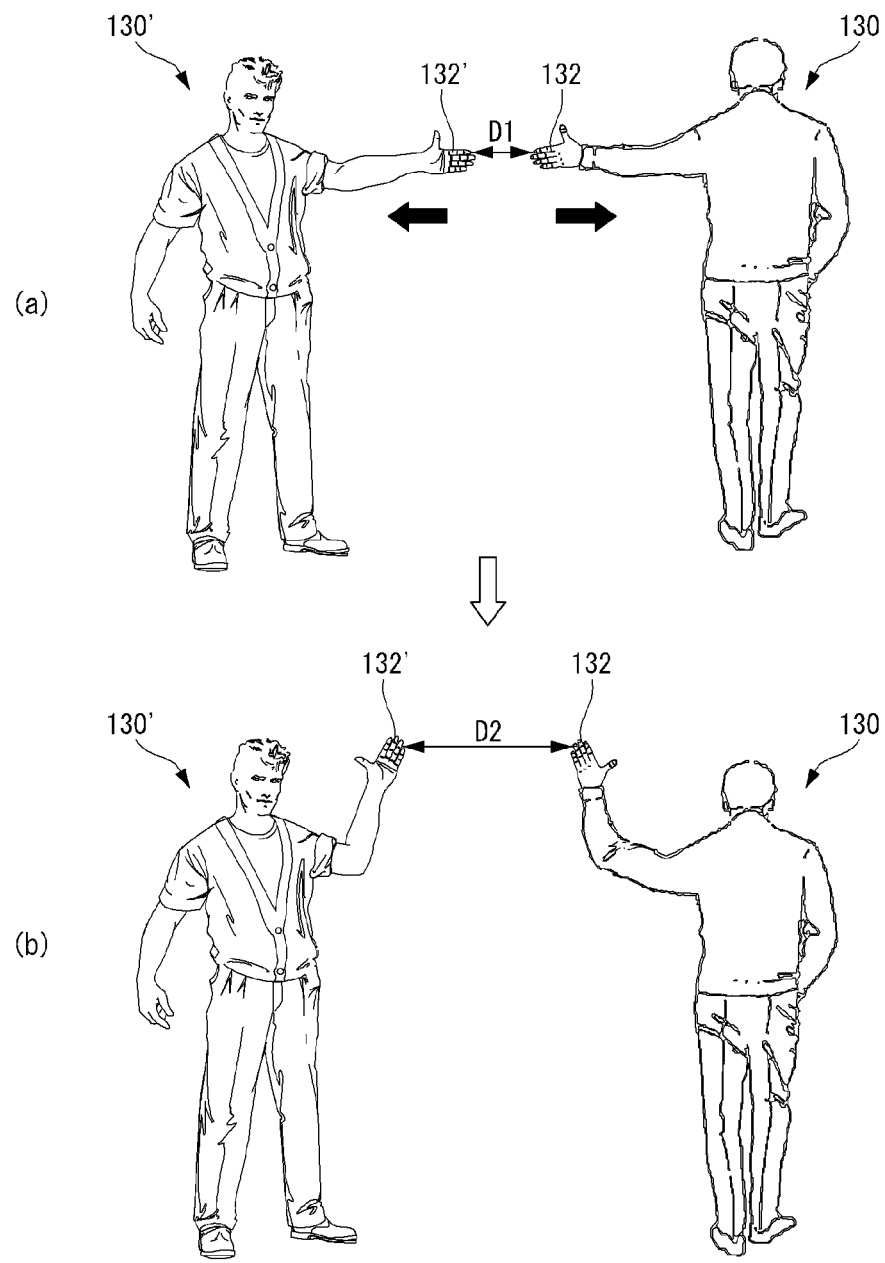
FIG. 18 illustrates an example where the first and second users make a zoom-in gesture when a control right is additionally granted the left hand of the second user while the control right is granted the left hand of the first user.

FIG. 18 illustrates an example where the first and second users 130 and 130' make a zoom-in gesture when a control right is additionally granted the left hand 132' of the second user 130' while the control right is granted the left hand 132 of the first user 130.

Referring to FIG. 18, if the first and second users 130 and 130' increase a distance between their left hands 132 and 132' from D1 to D2 (for example, (a)→(b)), the controller 180 of the electronic device 100 may recognize this as a gesture of zooming in the screen. However, this is merely an example of a predetermined zoom-in gesture, and the embodiments of this document are not limited thereto.

Figure 19:
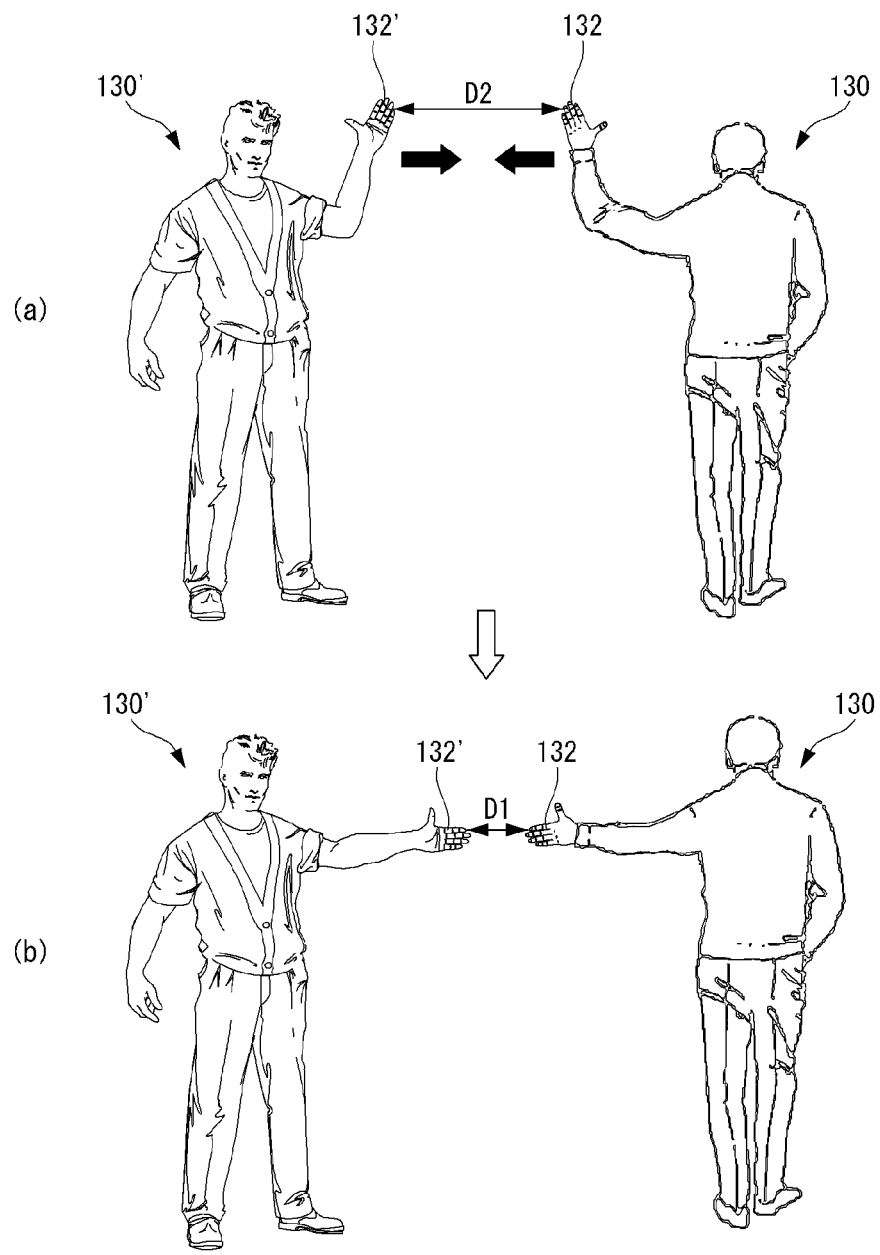
FIG. 19 illustrates an example of a zoom-out gesture by the first and second users in a case where a control right is additionally provided to the left hand of the second user while a control right has been provided to the left hand of the first user.

FIG. 19 illustrates an example of a zoom-out gesture by the first and second users 130 and 130' in a case where a control right is additionally provided to the left hand 132' of the second user 130' while a control right has been provided to the left hand 132 of the first user 130.

Referring to FIG. 19, if the first and second users 130 and 130' decrease a distance between their left hands 132 and 132' from D2 to D1 (for example, (a)→(b)), the controller 180 of the electronic device 100 may recognize this as a gesture of zooming out the screen. However, this is merely an example of a predetermined zoom-out gesture, and the embodiments of this document are not limited thereto.

The method of disregarding unnecessary gestures considering directivity of zoom-in and zoom-out gestures and difference in speed and time between zoom-in and zoom-out gestures as described in connection with FIGS. 13 to 14 may apply to the user interfaces shown in FIGS. 18 and 19 as well. This is apparent to one of ordinary skill in the art from those described in connection with FIGS. 15 and 16, and detailed description thereof will be omitted.

Figure 20:
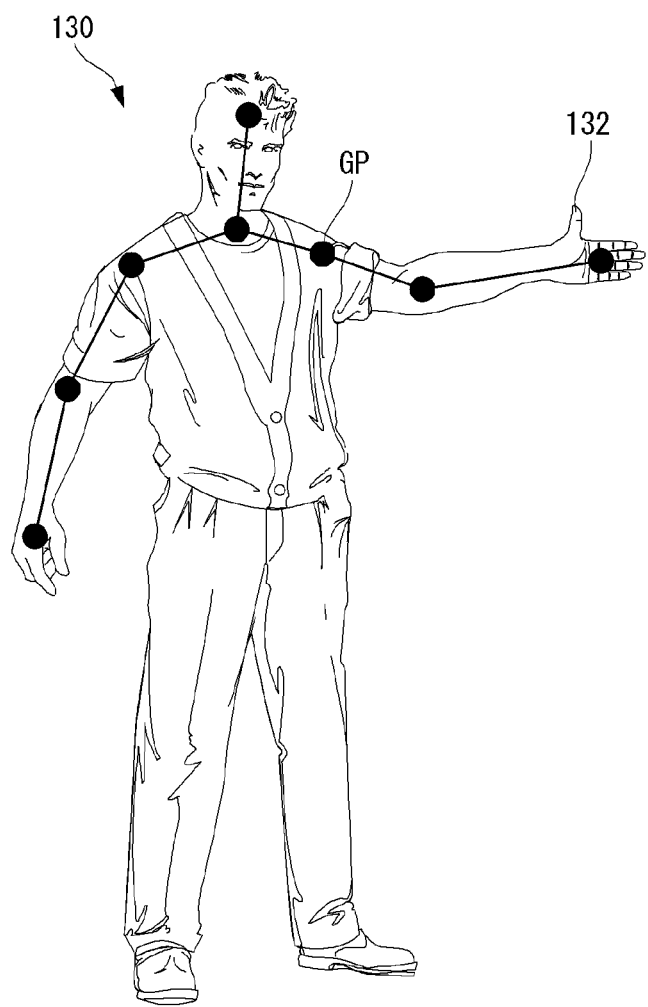
FIG. 20 illustrates a process of determining whether first and second body parts are included in the same user in the method shown in FIG. 9.

FIG. 20 illustrates an example of a process of determining whether first and second body parts are included in the same user in the method shown in FIG. 9. According to FIG. 20, such determination is made based on whether the first and second body parts are included in a skeleton-based region of the same user.

Referring to FIG. 20, the controller 180 of the electronic device 100 sets a plurality of gesture points on body parts of a user. For example, since a gesture point GP1 corresponding to the left hand 132 of the user 130 which is the first body part is connected to a gesture point GP2 corresponding to the right hand 133 of the user 130 which is the second body part, the left hand 132 of the user 130 and the right hand 133 of the user 130 may be determined as body parts of the same user 130.

In a case where only the user 130 is included in an image obtained by the camera 121, even though the obtained image is a 2D image, an error is less likely to occur while the controller 180 determines whether the first and second body parts are included in the same user.

However, if a body part of the user 130 and a body part of another user are together included in the obtained image and the obtained image is a 2D image, the likelihood of occurrence of an error increases while the controller 180 determines whether the first and second body parts are included in the same user.

For example, a reason may be because when a body part of the user 130 and a body part of another user overlap each other in the obtained image, it is difficult to determine in which user the first and second body parts are included. Upon determining whether the first and second body parts are included in the same user, an analysis of depth data obtained by a 3D camera may help the likelihood of occurrence of an error to decrease.

Figure 21:
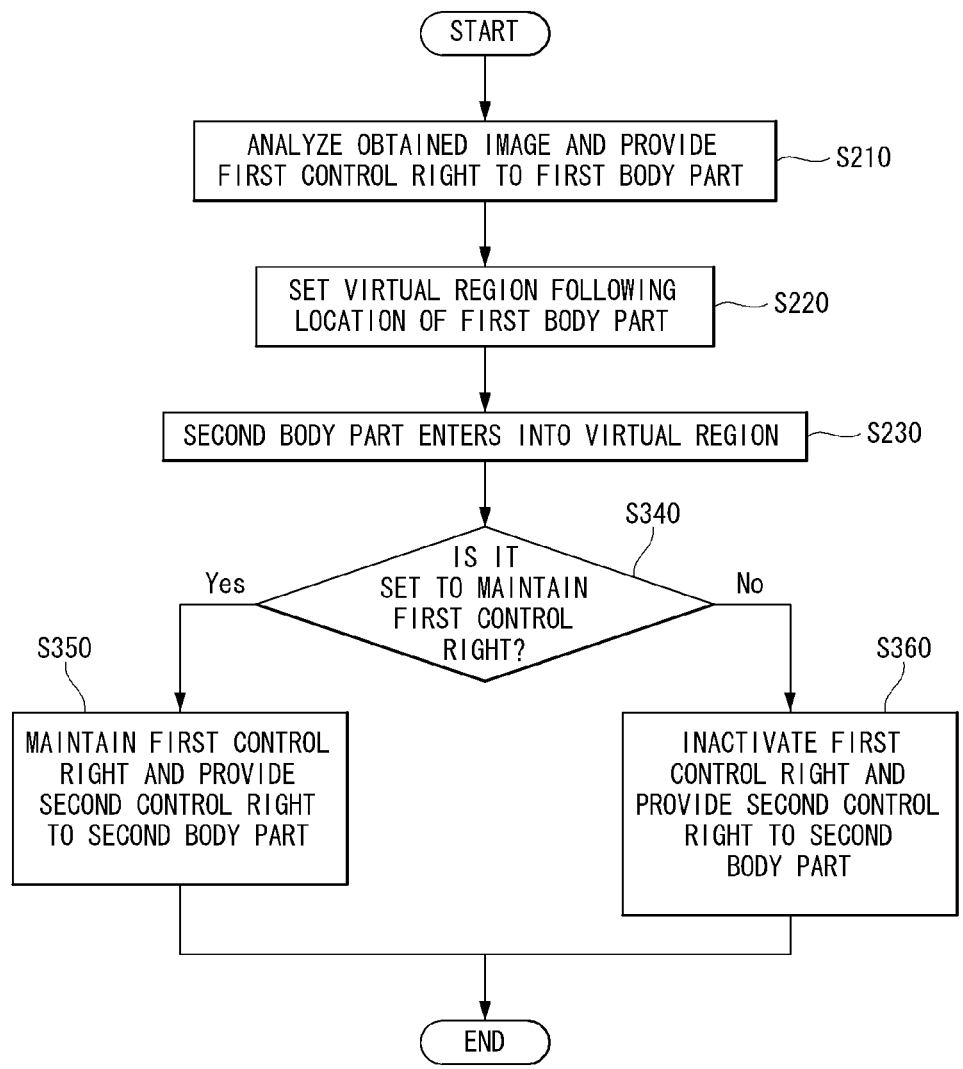
FIG. 21 is a flowchart illustrating a method of controlling an electronic device according to an embodiment of this document.

FIG. 21 is a flowchart illustrating a method of controlling an electronic device according to an embodiment of this document. It is assumed in FIG. 21 that first and second body parts are included in the same user. Hereinafter, the method of controlling an electronic device will be described with reference to FIGS. 1 and 21.

The controller 180 of the electronic device 100 analyzes an image obtained by the camera 121 to provide a first control right to a first body part of a user (S210) and sets a virtual region following the first body part (S220). Then, if an analysis result of the image obtained by the camera 121 shows that a second body part of the user enters into the virtual region (S230), the controller 180 determines whether the first control right provided to the first body part is maintained (S340).

If it is set to maintain the first control right, the controller 180 may provide a second control right to the second body part while maintaining the first control right (S350). For example, the controller 180 activates a gesture user interface using the first and second body parts.

However, if it is set to inactivate the first control right, the controller 180 inactivates the first control right and provides the second control right to the second body part (S360). For example, the controller 180 may change body parts used for a gesture user interface from the first body part to the second body part.

Assuming that the first and second body parts are not included in the same user unlike FIG. 21, the controller 180 may set a plurality of persons authorized to control the electronic device 100 or may change persons authorized to control the electronic device 100 through step S350 or S360.

Figure 22:
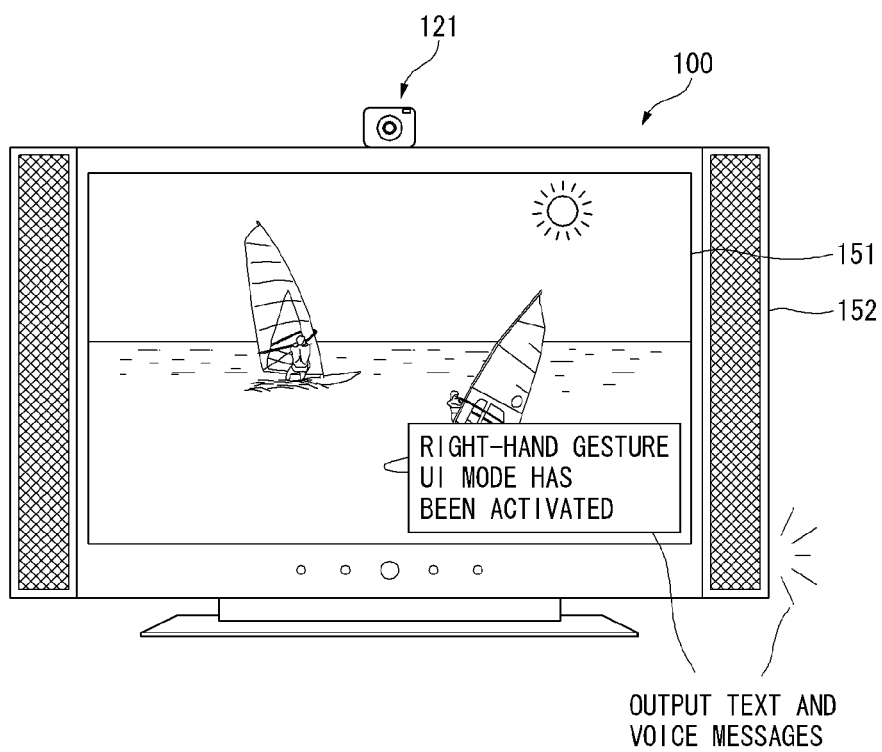
FIG. 22 illustrates an example where a result of inactivation of a gesture user interface is displayed on the electronic device 100 according to the method illustrated in FIG. 21.

FIG. 22 illustrates an example where a result of inactivation of a gesture user interface is displayed on the electronic device 100 according to the method illustrated in FIG. 21. For example, it is illustrated in FIG. 22 that while a left hand gesture user interface is activated, the user's right hand enters into a virtual region, and when the right hand enters into the virtual region, a control right for the left hand is inactivated.

Referring to FIG. 22, text and voice messages saying "right hand gesture UI mode has been activated" are outputted through the display 151 of the electronic device 100 and the audio output module 152 of the electronic device 100, respectively. Although not shown in FIG. 22, the controller 180 in this and other embodiments may output various text messages and/or voice message corresponding to various settings of the gesture user interface.

Figure 23:
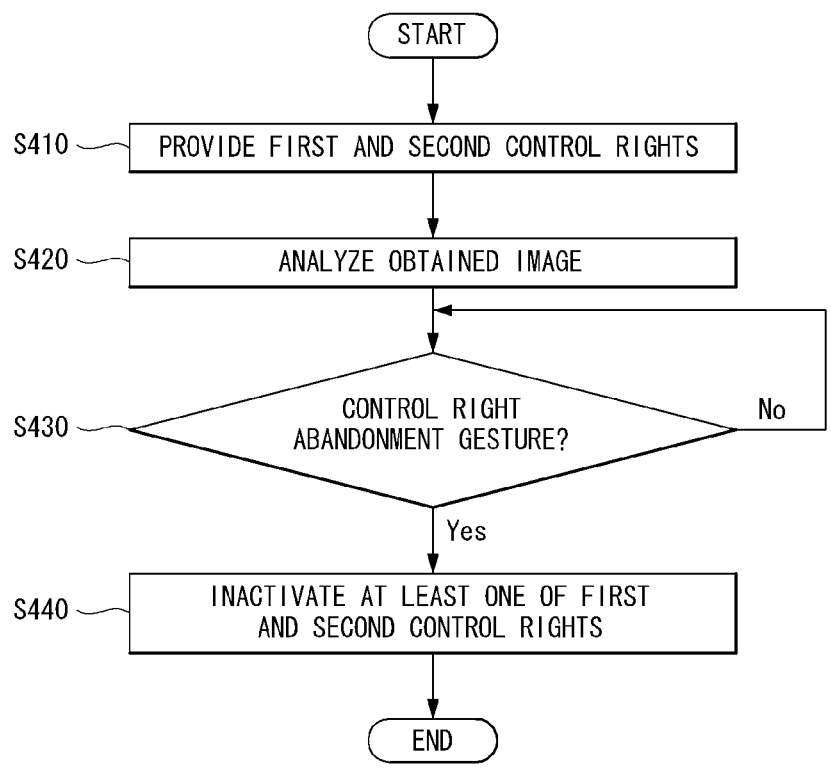
FIG. 23 illustrates a method of controlling an electronic device according to an embodiment of this document.

FIG. 23 illustrates a method of controlling an electronic device according to an embodiment of this document. For example, a process of inactivating a control right provided to a user's body part is described in connection with FIG. 23.

Hereinafter, the method of controlling an electronic device will be described with reference to FIGS. 1 and 23.

First, the controller 180 of the electronic device 100 provides first and second control rights to first and second body parts of at least one user, respectively (S410). Then, the controller 180 continuously analyzes an image of the user that has been captured by the camera 121 (S420) and determines whether a predetermined gesture of abandoning a control right is recognized (S430).

If the predetermined control right abandonment gesture is recognized, the controller 180 inactivates at least one of the first and second control rights (S440). The predetermined control right abandonment gesture may be changed depending on aspects of abandoning the provided control rights. Some examples will be described with reference to FIGS. 24 to 27.

Figure 24:
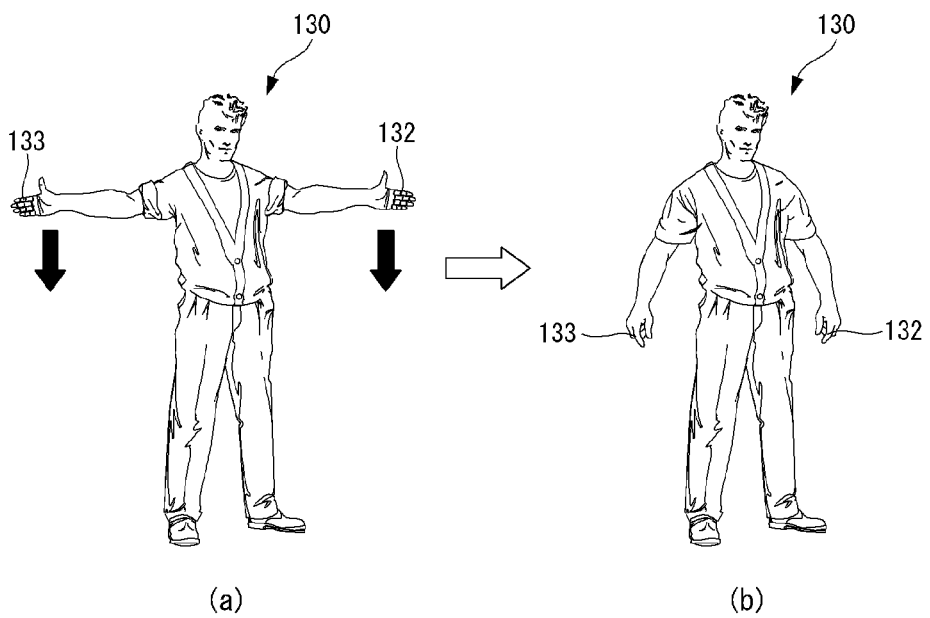
FIG. 24 illustrates an example of a control right abandonment gesture according to the method illustrated in FIG. 23.

FIG. 24 illustrates an example of a control right abandonment gesture according to the method illustrated in FIG. 23. A gesture of the user raising his hands 132 and 133 as high as his shoulders and then lowers hands toward his waist may be preset as a gesture of abandoning both the first and second control rights. Upon recognizing the gesture of the user 130, the controller 180 of the electronic device 100 may inactivate both the first and second control rights provided to the two hands 132 and 133.

Figure 25:
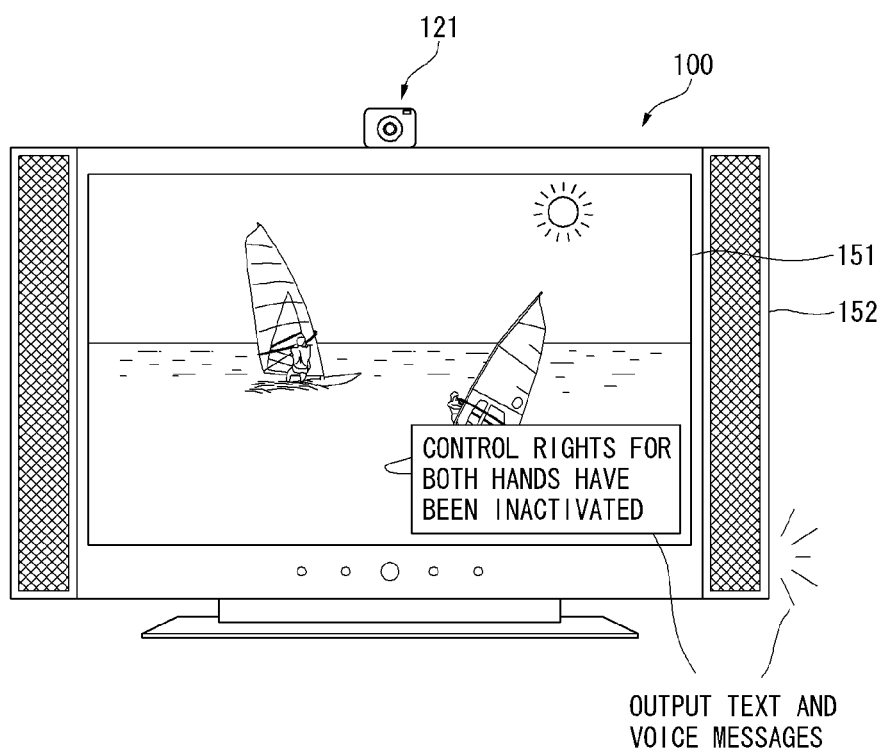
FIG. 25 illustrates an example of displaying on the display of the electronic device a result of abandonment of a control right according to the control right abandonment gesture illustrated in FIG. 24.

FIG. 25 illustrates an example of displaying on the display 151 of the electronic device 100 a result of abandonment of a control right according to the control right abandonment gesture illustrated in FIG. 24. Referring to FIG. 25, upon recognizing that the user 130 makes the gesture illustrated in FIG. 24, the controller 180 may output a message saying "control rights for both hands have been inactivated" through the display 151 and the audio output module 152 of the electronic device 100.

Figure 26:
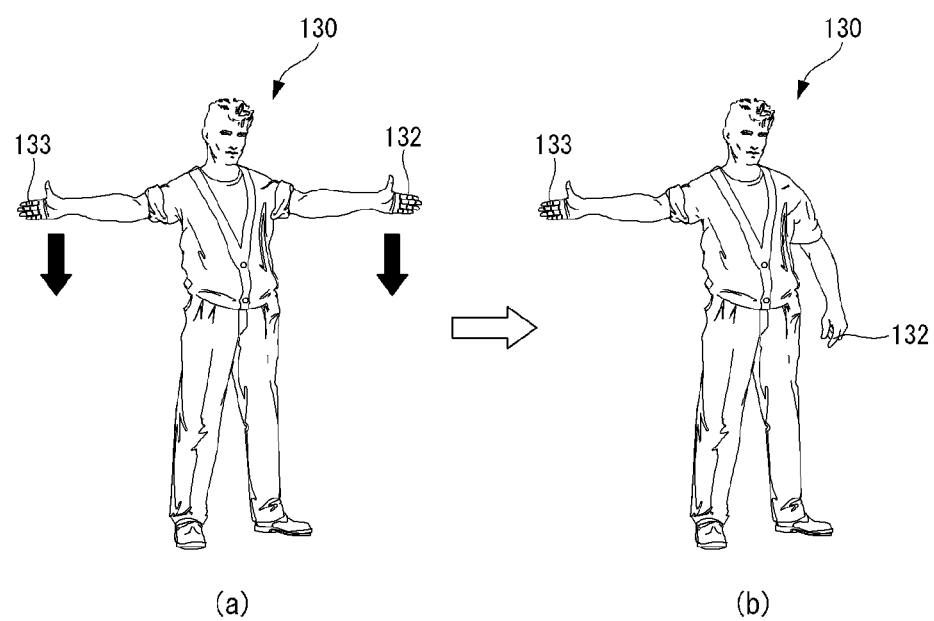
FIG. 26 illustrates an example of a control right abandonment gesture according to the method illustrated in FIG. 23.

FIG. 26 illustrates an example of a control right abandonment gesture according to the method illustrated in FIG. 23. A gesture of the user raising his left hand 132 as high as his shoulders and then lowering the left hand toward his waist may be assumed to be preset as a gesture of abandoning the first control right. Upon recognizing the gesture of the user 130, the controller 180 of the electronic device 100 may inactivate the first control rights provided to the left hand 132.

Figure 27:
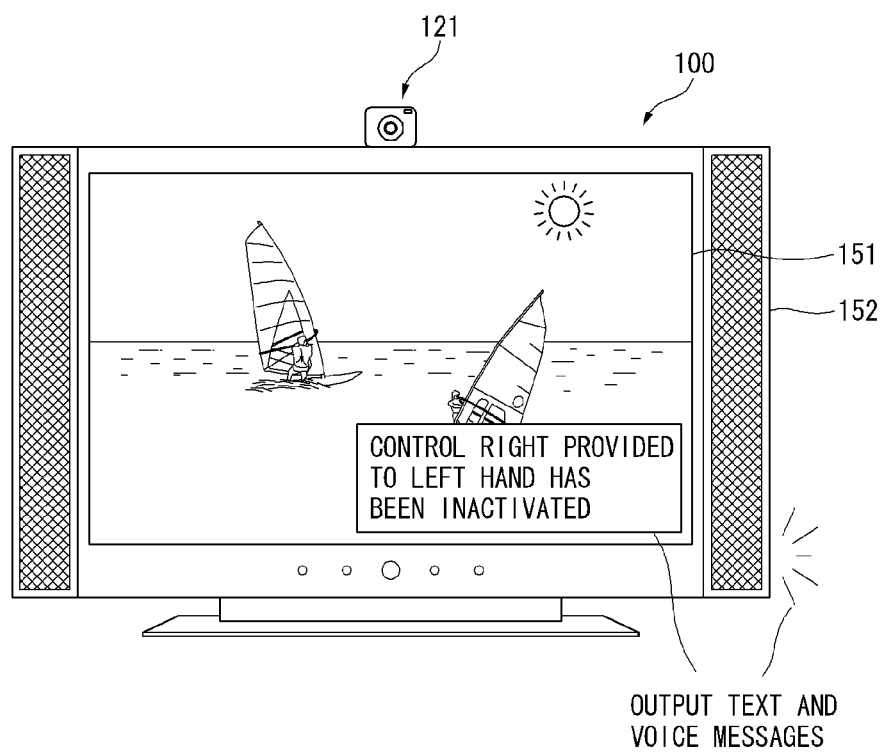
FIG. 27 illustrates an example of displaying on the display of the electronic device a result of abandonment of a control right according to the control right abandonment gesture illustrated in FIG. 26.

FIG. 27 illustrates an example of displaying on the display 151 of the electronic device 100 a result of abandonment of a control right according to the control right abandonment gesture illustrated in FIG. 26. Referring to FIG. 27, upon recognizing that the user 130 makes the gesture illustrated in FIG. 26, the controller 180 may output a message saying "control right for left hand has been inactivated" through the display 151 and the audio output module 152 of the electronic device 100.

Figure 28:
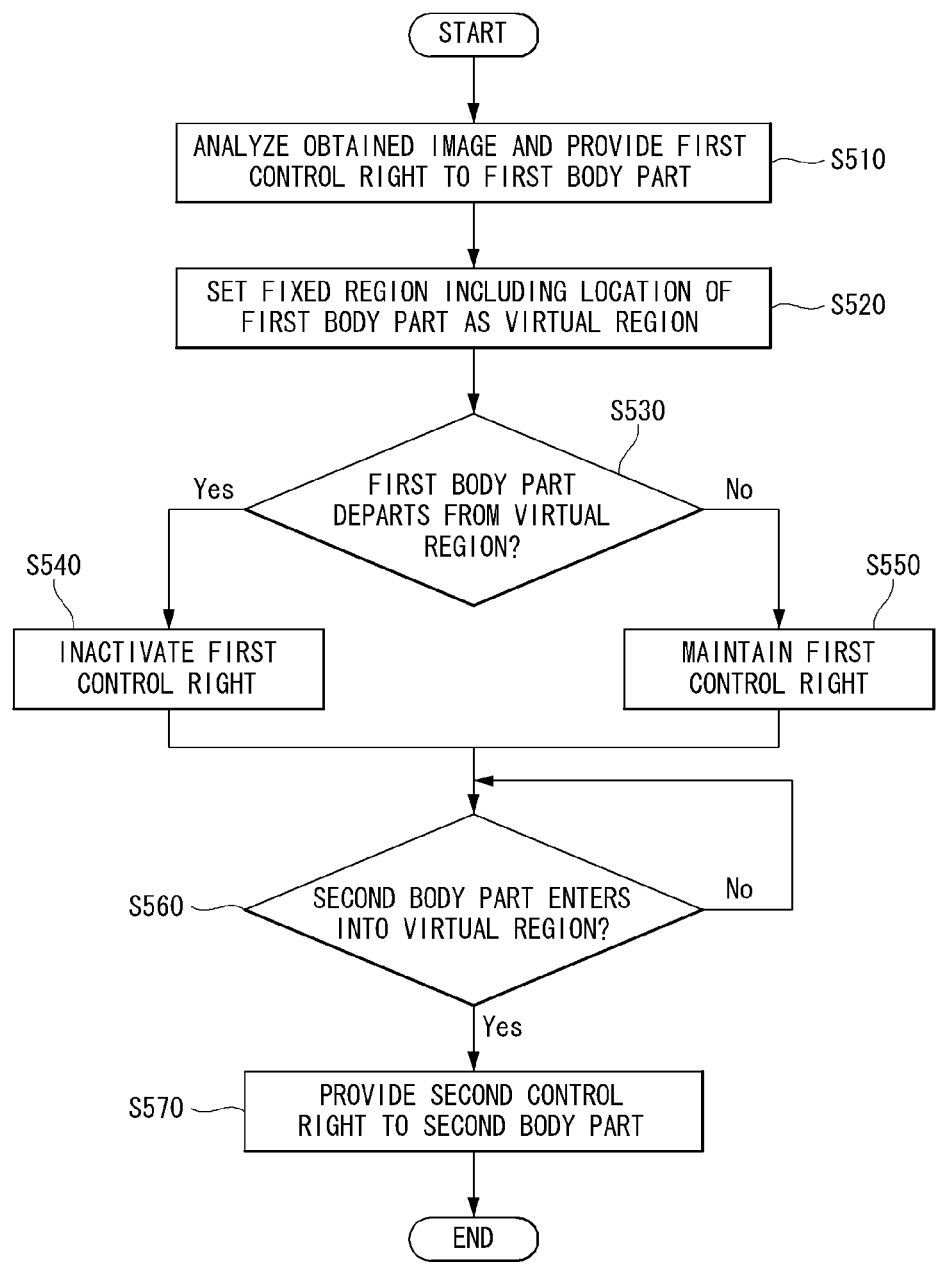
FIG. 28 is a flowchart illustrating a method of controlling an electronic device according to an embodiment of this document.

FIG. 28 is a flowchart illustrating a method of controlling an electronic device according to an embodiment of this document. It is assumed in FIG. 28 that the first and second body parts are included in the same user, but as discussed above, they can belong to different users. Hereinafter, the method of controlling an electronic device will be described with reference to FIGS. 1 and 28.

The controller 180 of the electronic device 100 analyzes an image obtained by the camera 121 and provides a first control right to a first body part of a user (S510). Then, the controller 180 sets a fixed region including the first body part as a virtual region at a specific time (S520).

Here, the virtual regions being the fixed region preferably means that the virtual region does not change its position even when the user moves the first body part which is a basis of setting of the virtual region to another position or location.

Further, the time of setting of the virtual region may be a time that the first control right is provided to the first body part or a time that the controller 180 recognizes that a gesture by the first body part corresponds to a predetermined gesture for setting the virtual region.

As described in connection with FIG. 2, the controller 180 may release setting of the virtual region when a predetermined time has passed since the virtual region was set. The setting or release of setting of the virtual region has been described above, and thus, repetitive description will be omitted.

If the virtual region is set, the controller 180 analyzes an image obtained by the camera 121 and determines whether the first body part departs from the virtual region (S530). If the first body part departs from the virtual region, the controller 180 inactivates the first control right provided to the first body part (S540). However, if the first body part is within the virtual region, the controller 180 maintains the first control right provided to the first body part (S550).

Then, the controller 180 analyzes an image obtained by the camera 121 and determines whether the second body part of the user enters into the virtual region (S560). If the second body part enters into the virtual region, the controller 180 may provide the second control right to the second body part.

If the first control right is inactivated according to step S540, the controller 180 activates a gesture user interface using the second body part. However, if the first control right is maintained according to step S540, the controller 180 activates a multi-gesture user interface using the first and second body parts.

In a variation, if it is assumed that the first and second body parts are included in different users, respectively, then the controller 180 may set a plurality of persons authorized to control the electronic device 100 or may change persons authorized to control the electronic device 100 through steps S530 to S570.

Figure 29:
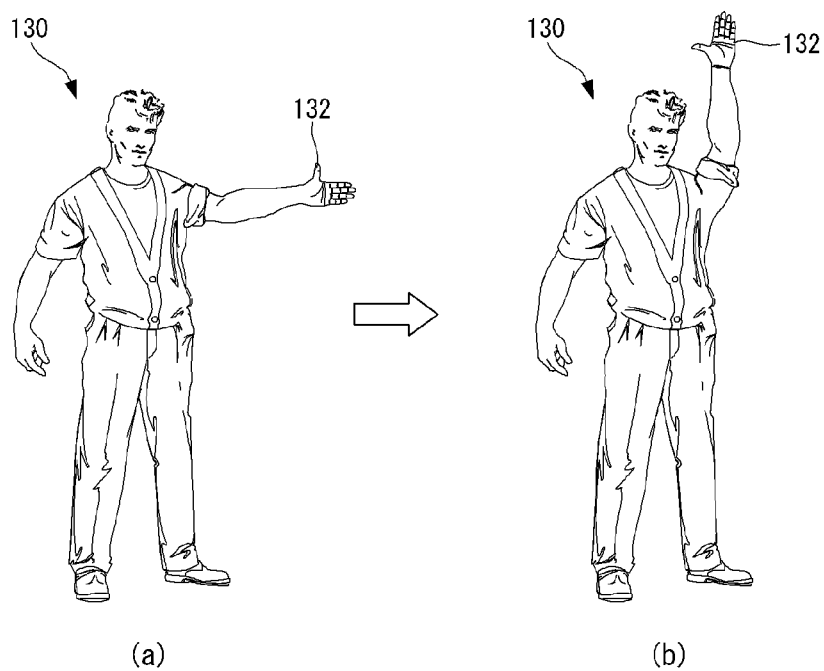
FIG. 29 illustrates an example of a virtual region setting gesture according to the method illustrated in FIG. 28.

FIG. 29 illustrates an example of a virtual region setting gesture according to the method illustrated in FIG. 28. Referring to FIG. 29, a user of the electronic device 100 may set a virtual region including the left hand 132 by lifting his left hand 132 that has been positioned to be parallel with his shoulders beyond his head. This gesture is merely an example of a gesture of setting the virtual region, and the embodiments of this document are not limited thereto.

If the above gesture is a gesture to provide a control right for the electronic device 100 to the left hand 132, the virtual region may be set while a control right is simultaneously provided to the left hand 132. Further, the user may also set a virtual region for changing the settings of a gesture user interface by making the above gesture a predetermined time after the control right has been provided to the left hand 132.

Figure 30:
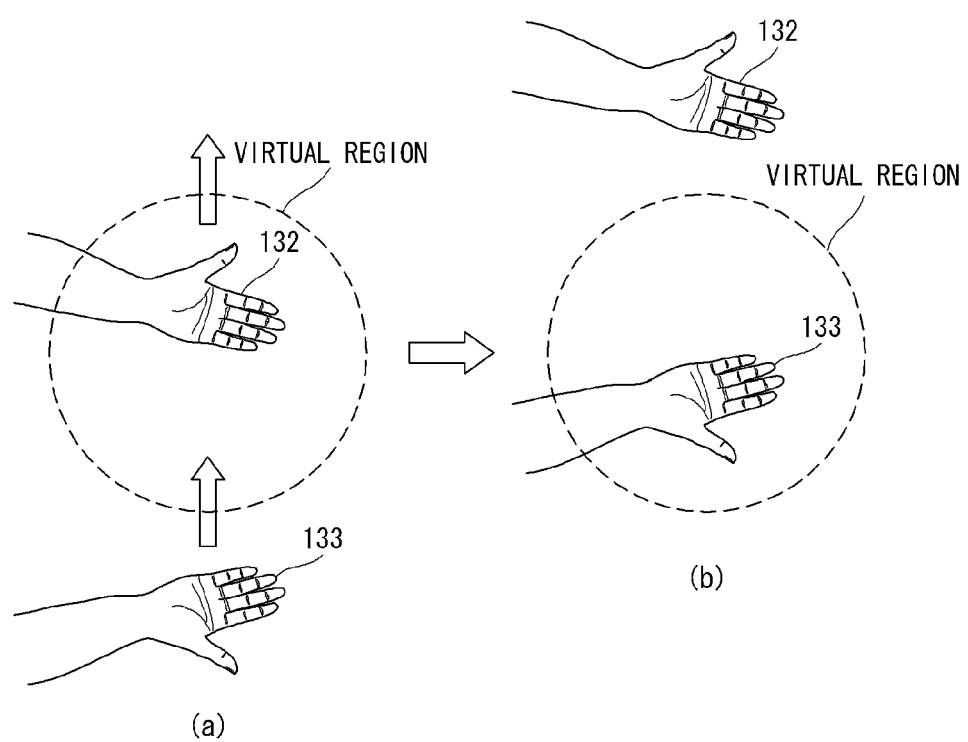
FIG. 30 illustrates a process of changing control rights of a gesture user interface according to the method illustrated in FIG. 28.

FIG. 30 illustrates a process of changing control rights of a gesture user interface according to the method illustrated in FIG. 28. Referring to (a) of FIG. 30, while the first control right is provided to the user's left hand 132 and a 3D virtual region which is a spherical fixed region and includes the left hand 132 is set, the user moves his left hand 132 outside of the virtual region and moves his right hand 133 inside of the virtual region. The first control right provided to the left hand 132 may still be maintained and the second control right is not yet provided to the right hand 133.

Referring to (b) of FIG. 30, the left hand 132 departs from the virtual region, and the right hand 133 enters into the virtual region. The controller 180 may inactivate the first control right provided to the left hand 132 and may provide the second control right to the right hand 133. For example, as shown in FIG. 30, the controller 180 may change body parts used for the gesture user interface for the electronic device 100 from the left hand 132 to the right hand 133.

Figure 31:
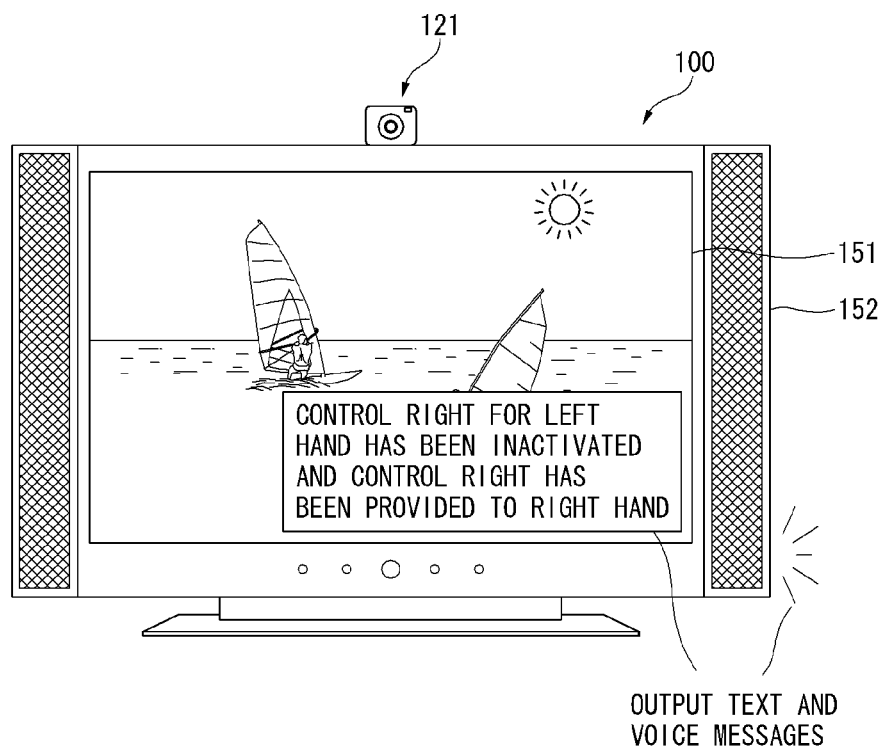
FIG. 31 illustrates an example of displaying a result of change of control rights of the gesture user interface by the gesture illustrated in FIG. 30.

FIG. 31 illustrates an example of displaying a result of change of control rights of the gesture user interface by the gesture illustrated in FIG. 30. Referring to FIG. 31, the controller 180 of the electronic device 100 may output a message saying "control right for left hand has been inactivated and control right has been provided to right hand" through the display 151 and the audio output module 152.

Figure 32:
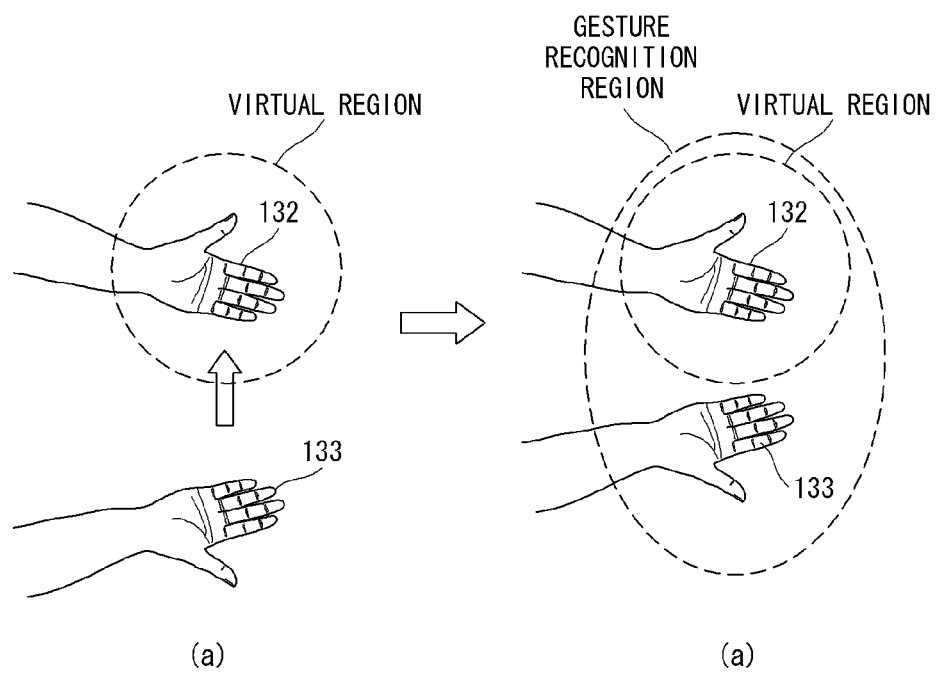
FIG. 32 illustrates an example where if a both-hand gesture user interface is activated, a region including a virtual region set around the left hand granted a control right is set as a gesture recognition region.

FIG. 32 illustrates an example where if a both-hand gesture user interface is activated, a region including a virtual region set around the left hand 132 granted with a control right is set as a gesture recognition region. Referring to (a) of FIG. 32, the right hand 133 enters into the virtual region set around the left hand 132 granted with the control right. Then, the controller 180 of the electronic device 100 releases setting of the virtual region and sets the gesture recognition region to include the space of the virtual region around both hands 132 and 133 (refer to (b) of FIG. 32).

Figure 33:
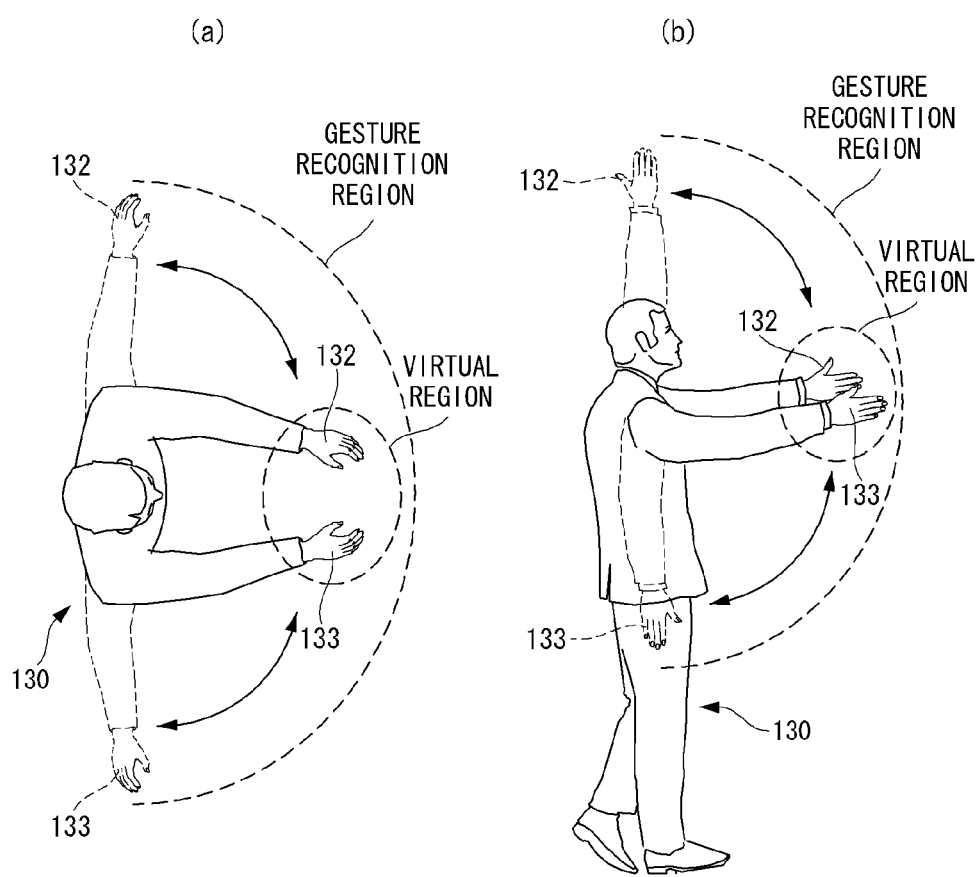
FIG. 33 illustrates an example where when a both-hand user interface is activated, a region including a virtual region set around a left hand granted a control right is set as a gesture recognition region.

FIG. 33 illustrates an example where when a both-hand user interface is activated, a region including a virtual region set around a left hand 132 granted with a control right is set as a gesture recognition region. Referring to FIG. 33, if the right hand 133 enters into a virtual region set around the left hand 132, the controller 180 of the electronic device 100 sets a 3D space which includes the virtual region and where the two hands 132 and 133 may be positioned as a gesture recognition region.

Figure 34:
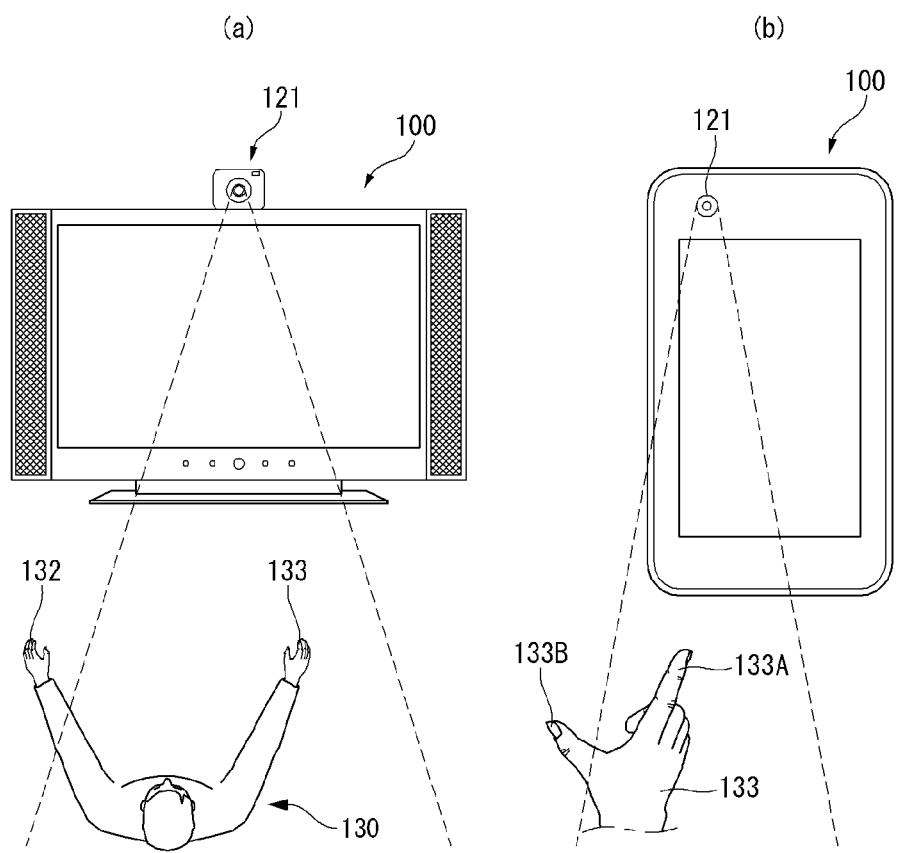
FIG. 34 illustrates an example where when a user's body part granted a control right departs from a recognition range of the camera, the control right granted to the body part is lost.

FIG. 34 illustrates an example where when a user's body part granted a control right departs from a recognition range of the camera 121, the control right granted to the body part is lost. Referring to (a) of FIG. 34, the left hand 132 of the user 200 which is granted a control right has departed from a recognition range of the camera 121 mounted on the TV 100. Then, the controller 180 of the TV 100 may relinquish the control light from the left hand 132.

Referring to (b) of FIG. 34, among the thumb 133B and index finger 133A granted with control rights, the thumb 133B departs from a recognition range of the camera 121 mounted on the mobile terminal 100. Then, the controller 180 of the mobile terminal 100 may relinquish the control right from the thumb 133B, and the mobile terminal 100 may be controlled by a gesture user interface using the index finger 133A.

The above-described methods according to the embodiments of this document may be implemented as programs that may be executed by various computer means and recorded in at least one computer-readable medium. The computer-readable medium may contain a program command, a data file, and a data structure, alone or in a combination thereof. The program recorded in the medium may be one specially designed or configured for the embodiments of this document or one known to those of ordinary skill in the art.

Examples of the computer-readable medium may include magnetic media, such as hard disks, floppy disks, or magnetic tapes, optical media, such as CD-ROMs or DVDs, magneto-optical media, such as floptical disks, ROMs, RAMs, flash memories, or other hardware devices that are configured to store and execute program commands. Examples of the program may include machine language codes such as those made by a compiler as well as high-class language codes executable by a computer using an interpreter. The above-listed hardware devices may be configured to operate as one or more software modules to perform the operations according to the embodiments of this document, and vice versa.

According to the embodiments of this document, the electronic device and the method of controlling the electronic device may easily and rapidly activate a gesture user interface using a plurality of objects and may easily and rapidly control the control rights provided to the plurality of objects.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that this document's usefulness is not limited thereto and that the invention can be beneficially utilized in any number of environments and implementations. The foregoing description and drawings are, accordingly, to be regarded in an illustrative rather than a restrictive sense.

What is claimed is:

1. An electronic device comprising:
a user input unit configured to receive gesture inputs; and
a controller operatively coupled to the user input unit and configured to:
detect a first object positioned outside the electronic device based on an image captured from a camera associated with the electronic device,
assign a first control right to the first object positioned outside the electronic device, the first control right activating an operation of controlling the electronic device by one or more gestures that are made by the first object in a gesture recognition region,
set a virtual region to be a predetermined area located outside the electronic device, the set virtual region including the first object having the first control right assigned thereto, wherein any object that enters the virtual region is assigned a control right to control the electronic device by a gesture made by that object, and the virtual region is smaller than the gesture recognition region,
when a second object enters the set virtual region, assign a second control right to the second object, the second control right activating an operation of controlling the electronic device by one or more gestures that are made by the second object in the gesture recognition region, and
after the second control right is assigned to the second object, control the electronic device according to the one or more gestures made by at least one of the first and second objects.

2. The electronic device of claim 1, wherein the virtual region surrounds the first object, and moves with the first object by following a movement of the first object.

3. The electronic device of claim 1, wherein the virtual region is fixed in space with respect to the camera, and does not move when the first object moves.

4. The electronic device of claim 1, wherein when the second control right is assigned to the second object, the controller enters the electronic device into a multi-object mode and tracks a movement of both the first and second objects to control the electronic device by the one or more gestures made by the first and second objects.

5. The electronic device of claim 1, wherein when the second control right is assigned to the second object, the controller enters the electronic device into a single object mode by relinquishing the first control right from the first object, and tracks a movement of the second object to control the electronic device by the one or more gestures made by only the second object.

6. The electronic device of claim 1, wherein when the second object enters into the virtual region, the controller provides the second control right to the second object while maintaining the first control right provided to the first object.

7. The electronic device of claim 1, wherein when the second object enters into the virtual region, the controller inactivates the first control right provided to the first object while providing the second control right to the second object.

8. The electronic device of claim 1, wherein when the first object is moved according to a predetermined trajectory, the controller sets the virtual region based on the predetermined trajectory.

9. The electronic device of claim 1, wherein the gesture recognition region includes the virtual region and other areas located outside the electronic device.

10. The electronic device of claim 1, wherein the controller releases setting of the virtual region when a predetermined time has passed after the virtual region was set or when the second object enters into the virtual region within the predetermined time after the virtual region has been set.

11. The electronic device of claim 1, wherein the first and second objects are parts of one user.

12. A method for controlling an electronic device including a controller, the method comprising:
  detecting, by the controller, a first object positioned outside the electronic device based on an image captured from a camera associated with the electronic device;
  assigning, by the controller, a first control right to the first object positioned outside the electronic device, the first control right activating an operation of controlling the electronic device by one or more gestures that are made by the first object in a gesture recognition region;
  setting a virtual region to be a predetermined area located outside the electronic device, the set virtual region including the first object having the first control right assigned thereto, wherein any object that enters the virtual region is assigned a control right to control the electronic device by a gesture made by that object, and the virtual region is smaller than the gesture recognition region;
  a second object enters the set virtual region, assigning a second control right to the second object, the second control right activating an operation of controlling the electronic device by one or more gestures that are made by the second object in the gesture recognition region; and
  after the second control right is assigned to the second object, controlling the electronic device according to the one or more gestures made by at least one of the first and second objects.

13. The method of claim 12, wherein the virtual region is a predetermined area surrounds the first object, and moves with the first object by following a movement of the first object.

14. The method of claim 12, wherein the virtual region is fixed in space with respect to the camera, and does not move when the first object moves.

15. The method of claim 12, further comprising:
  when the second control right is assigned to the second object, entering the electronic device into a multi-object mode, and tracking a movement of both the first and second objects to control the electronic device by the one or more gestures made by the first and second objects.

16. The method of claim 12, further comprising:
  when the second control right is assigned to the second object, entering the electronic device into a single object mode by relinquishing the first control right from the first object, and tracking a movement of the second object to control the electronic device by the one or more gestures made by only the second object.

17. The method of claim 12, wherein when the second object enters into the virtual region, the step of assigning the second control right includes:
  providing the second control right to the second object while maintaining the first control right provided to the first object.

18. The method of claim 12, wherein when the second object enters into the virtual region, the step of assigning the second control right includes:
  inactivating the first control right provided to the first object while providing the second control right to the second object.

19. The method of claim 12, further comprising:
  when the first object is moved according to a predetermined trajectory, setting the virtual region based on the predetermined trajectory.

20. The method of claim 12, further comprising:
  wherein the gesture recognition region includes the virtual region and other areas located outside the electronic device.

21. The method of claim 12, further comprising:
  releasing setting of the virtual region when a predetermined time has passed after the virtual region was set or when the second object enters into the virtual region within the predetermined time after the virtual region has been set.

22. The method of claim 12, wherein the first and second objects are parts of one user.

* * * * *